(12) United States Patent
Monobe et al.

(10) Patent No.: US 7,561,752 B2
(45) Date of Patent: Jul. 14, 2009

(54) IMAGE PROCESSING APPARATUS

(75) Inventors: Yusuke Monobe, Kadoma (JP); Toshiharu Kurosawa, Yokohama (JP); Akio Kojima, Neyagawa (JP); Yasuhiro Kuwahara, Osaka (JP); Tatsumi Watanabe, Moriguchi (JP); Hirotaka Oku, Katano (JP)

(73) Assignee: Panasonic Corporation, Osaka (JP)

(*) Notice: Subject to any disclaimer, the term of this patent is extended or adjusted under 35 U.S.C. 154(b) by 914 days.

(21) Appl. No.: 10/477,317

(22) PCT Filed: May 10, 2002

(86) PCT No.: PCT/JP02/04596

§ 371 (c)(1),
(2), (4) Date: Nov. 10, 2003

(87) PCT Pub. No.: WO02/093935

PCT Pub. Date: Nov. 21, 2002

(65) Prior Publication Data

US 2004/0165785 A1    Aug. 26, 2004

(30) Foreign Application Priority Data

May 10, 2001  (JP) .............................. 2001-139764
Nov. 22, 2001  (JP) .............................. 2001-357139

(51) Int. Cl.
*G06K 9/40* (2006.01)
*H04N 7/12* (2006.01)
*G06T 5/00* (2006.01)
*G06K 9/36* (2006.01)

(52) U.S. Cl. ........................ 382/268; 382/233; 382/261; 382/275; 375/240.29; 375/E7.135

(58) Field of Classification Search ......... 382/232–233, 382/262, 268, 274–275, 261, 250, 251, 266–267; 375/240.03, 240.27, 240.29, 240.2, 240.24, 375/E7.135, E7.176, E7.182, E7.193, E7.226, 375/E7.241, E7.252
See application file for complete search history.

(56) References Cited

U.S. PATENT DOCUMENTS

| 5,479,211 | A | * | 12/1995 | Fukuda .................. 375/240.03 |
| 5,732,159 | A | * | 3/1998 | Jung .......................... 382/262 |
| 5,787,204 | A | * | 7/1998 | Fukuda ...................... 382/233 |
| 5,818,964 | A | * | 10/1998 | Itoh .......................... 382/205 |
| 5,844,614 | A | * | 12/1998 | Chong et al. ........... 375/240.24 |
| 5,937,101 | A | * | 8/1999 | Jeon et al. ................... 382/268 |
| 6,175,596 | B1 | * | 1/2001 | Kobayashi et al. ..... 375/240.27 |
| 6,434,275 | B1 | * | 8/2002 | Fukuda et al. .............. 382/275 |
| 6,463,182 | B1 | * | 10/2002 | Onishi et al. ............... 382/261 |

(Continued)

FOREIGN PATENT DOCUMENTS

JP        63-209274 A       8/1988

(Continued)

*Primary Examiner*—Patel Kanji
(74) *Attorney, Agent, or Firm*—McDermott Will & Emery LLP

(57) ABSTRACT

An image processing apparatus for removing block distortion comprises an area specifying unit 103 for specifying a block distortion area to remove the block distortion therefrom in a reconstructed image decoded from a compressed data, and a block distortion area noise removing unit 104 for removing the noise from the block distortion area.

22 Claims, 28 Drawing Sheets
(4 of 28 Drawing Sheet(s) Filed in Color)

U.S. PATENT DOCUMENTS 6,665,346 B1 * 12/2003 Lee et al. ............... 375/240.29
6,748,113 B1 * 6/2004 Kondo et al. ................ 382/232
6,823,089 B1 * 11/2004 Yu et al. ..................... 382/268

FOREIGN PATENT DOCUMENTS

| JP | 3-166825 A | 7/1991 |
| --- | --- | --- |
| JP | 4-209073 | 7/1992 |
| JP | 308623 A | 11/1993 |
| JP | 7-23227 A | 1/1995 |
| JP | 2001-78187 A | 1/1995 |
| JP | 7-170512 A | 7/1995 |
| JP | 7-170518 | 7/1995 |
| JP | 8-214309 | 8/1996 |
| JP | 8-307870 A | 11/1996 |
| JP | 2001-86367 A | 3/2001 |

* cited by examiner

Fig.2

Standard Quantization Table of Brightness Component (Y)

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig.3

Standard Quantization Table of Color Difference Component (Cr, Cb)

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

Fig.10

|   |   |   |   |   |   |   |   |
|---|---|---|---|---|---|---|---|
| * | * | * | O | O | O | O | O |
| * | * | O | O | O | O | O | O |
| * | O | O | O | O | O | O | O |
| O | O | O | O | O | O | O | O |
| O | O | O | O | O | O | O | O |
| O | O | O | O | O | O | O | O |
| O | O | O | O | O | O | O | O |
| O | O | O | O | O | O | O | O |

( * Arbitrary Value )

Fig.11

| LU | U | RU |
|----|---|----|
| L  | X | R  |
| LD | D | RD |

Fig.16

| | | | | | | | | | | | |
|---|---|---|---|---|---|---|---|---|---|---|---|
| | | | | | | | X | | | | |
| | | | | | | | ↓ | | | | |
| | | f(0,0) | f(0,1) | f(0,2) | f(0,3) | f(0,4) | f(0,5) | f(0,6) | f(0,7) | | |
| | | f(1,0) | f(1,1) | f(1,2) | f(1,3) | f(1,4) | f(1,5) | f(1,6) | f(1,7) | | |
| | | f(2,0) | f(2,1) | f(2,2) | f(2,3) | f(2,4) | f(2,5) | f(2,6) | f(2,7) | | |
| | | f(3,0) | f(3,1) | f(3,2) | f(3,3) | f(3,4) | f(3,5) | f(3,6) | f(3,7) | | |
| | | f(4,0) | f(4,1) | f(4,2) | f(4,3) | f(4,4) | f(4,5) | f(4,6) | f(4,7) | | |
| | | f(5,0) | f(5,1) | f(5,2) | f(5,3) | f(5,4) | f(5,5) | f(5,6) | f(5,7) | | |
| | | f(6,0) | f(6,1) | f(6,2) | f(6,3) | f(6,4) | f(6,5) | f(6,6) | f(6,7) | | |
| | | f(7,0) | f(7,1) | f(7,2) | f(7,3) | f(7,4) | f(7,5) | f(7,6) | f(7,7) | | |
| | | | | | | | | | | | |
| | | | | | | | | | | | |

Fig.20

Filter Deciding Table

| | Magnifying Ratio Level 1 | Magnifying Ratio Level 2 | Magnifying Ratio Level 3 |
|---|---|---|---|
| Compression Ratio Level 1 | A-1<br>7×7 filter of 1's<br>÷49 | B-1<br>5×5 filter of 1's<br>÷25 | C-1<br>3×3 filter of 1's<br>÷9 |
| Compression Ratio Level 2 | A-2<br>5×5 filter of 1's<br>÷25 | B-2<br>3×3 filter of 1's<br>÷9 | C-2<br>1 |
| Compression Ratio Level 3 | A-3<br>3×3 filter of 1's<br>÷9 | B-3<br>1 | C-3<br>1 |

Fig.21

Filter Deciding Table

| | Magnifying Ratio Level 1 | Magnifying Ratio Level 2 | Magnifying Ratio Level 3 |
|---|---|---|---|
| Compression Ratio Level 1 | $\begin{array}{\|c\|c\|c\|}\hline 1&1&1\\\hline 1&1&1\\\hline 1&1&1\\\hline\end{array}$ ÷9 | $\begin{array}{\|c\|c\|c\|}\hline 1&2&1\\\hline 2&4&2\\\hline 1&2&1\\\hline\end{array}$ ÷16 | $\begin{array}{\|c\|c\|c\|}\hline 1&4&1\\\hline 4&12&4\\\hline 1&4&1\\\hline\end{array}$ ÷32 |
| Compression Ratio Level 2 | $\begin{array}{\|c\|c\|c\|}\hline 1&2&1\\\hline 2&4&2\\\hline 1&2&1\\\hline\end{array}$ ÷16 | $\begin{array}{\|c\|c\|c\|}\hline 1&4&1\\\hline 4&12&4\\\hline 1&4&1\\\hline\end{array}$ ÷32 | $\begin{array}{\|c\|c\|c\|}\hline 0&0&0\\\hline 0&1&0\\\hline 0&0&0\\\hline\end{array}$ |
| Compression Ratio Level 3 | $\begin{array}{\|c\|c\|c\|}\hline 1&4&1\\\hline 4&12&4\\\hline 1&4&1\\\hline\end{array}$ ÷32 | $\begin{array}{\|c\|c\|c\|}\hline 0&0&0\\\hline 0&1&0\\\hline 0&0&0\\\hline\end{array}$ | $\begin{array}{\|c\|c\|c\|}\hline 0&0&0\\\hline 0&1&0\\\hline 0&0&0\\\hline\end{array}$ |

Fig.22

Filter Deciding Table

| | Magnifying Power Level 1 | Magnifying Power Level 2 | Magnifying Power Level 3 |
|---|---|---|---|
| Compression Ratio Level 1 | $\begin{smallmatrix}1&2&3&4&3&2&1\\2&3&4&5&4&3&2\\3&4&5&6&5&4&3\\4&5&6&7&6&5&4\\3&4&5&6&5&4&3\\2&3&4&5&4&3&2\\1&2&3&4&3&2&1\end{smallmatrix}$ ÷175 | $\begin{smallmatrix}1&2&3&2&1\\2&3&4&3&2\\3&4&5&4&3\\2&3&4&3&2\\1&2&3&2&1\end{smallmatrix}$ ÷65 | $\begin{smallmatrix}1&2&1\\2&4&2\\1&2&1\end{smallmatrix}$ ÷16 |
| Compression Ratio Level 2 | $\begin{smallmatrix}1&2&3&2&1\\2&3&4&3&2\\3&4&5&4&3\\2&3&4&3&2\\1&2&3&2&1\end{smallmatrix}$ ÷65 | $\begin{smallmatrix}1&2&1\\2&4&2\\1&2&1\end{smallmatrix}$ ÷16 | $\boxed{1}$ |
| Compression Ratio Level 3 | $\begin{smallmatrix}1&2&1\\2&4&2\\1&2&1\end{smallmatrix}$ ÷16 | $\boxed{1}$ | $\boxed{1}$ |

Fig.25

| | | $A_{06}$ | $A_{16}$ | $A_{26}$ | $A_{36}$ | $A_{46}$ | $A_{56}$ | $A_{66}$ | $A_{76}$ | | |
|---|---|---|---|---|---|---|---|---|---|---|---|
| | | $A_{07}$ | $A_{17}$ | $A_{27}$ | $A_{37}$ | $A_{47}$ | $A_{57}$ | $A_{67}$ | $A_{77}$ | | |
| $B_{60}$ | $B_{70}$ | $P_{00}$ | $P_{10}$ | $P_{20}$ | $P_{30}$ | $P_{40}$ | $P_{50}$ | $P_{60}$ | $P_{70}$ | $C_{00}$ | $C_{00}$ |
| $B_{61}$ | $B_{71}$ | $P_{01}$ | $P_{11}$ | $P_{21}$ | $P_{31}$ | $P_{41}$ | $P_{51}$ | $P_{61}$ | $P_{71}$ | $C_{01}$ | $C_{01}$ |
| $B_{62}$ | $B_{72}$ | $P_{02}$ | $P_{12}$ | $P_{22}$ | $P_{32}$ | $P_{42}$ | $P_{52}$ | $P_{62}$ | $P_{72}$ | $C_{02}$ | $C_{02}$ |
| $B_{63}$ | $B_{73}$ | $P_{03}$ | $P_{13}$ | $P_{23}$ | $P_{33}$ | $P_{43}$ | $P_{53}$ | $P_{63}$ | $P_{73}$ | $C_{03}$ | $C_{03}$ |
| $B_{64}$ | $B_{74}$ | $P_{04}$ | $P_{14}$ | $P_{24}$ | $P_{34}$ | $P_{44}$ | $P_{54}$ | $P_{64}$ | $P_{74}$ | $C_{04}$ | $C_{04}$ |
| $B_{65}$ | $B_{75}$ | $P_{05}$ | $P_{15}$ | $P_{25}$ | $P_{35}$ | $P_{45}$ | $P_{55}$ | $P_{65}$ | $P_{75}$ | $C_{05}$ | $C_{05}$ |
| $B_{66}$ | $B_{76}$ | $P_{06}$ | $P_{16}$ | $P_{26}$ | $P_{36}$ | $P_{46}$ | $P_{56}$ | $P_{66}$ | $P_{76}$ | $C_{06}$ | $C_{06}$ |
| $B_{67}$ | $B_{77}$ | $P_{07}$ | $P_{17}$ | $P_{27}$ | $P_{37}$ | $P_{47}$ | $P_{57}$ | $P_{67}$ | $P_{77}$ | $C_{07}$ | $C_{07}$ |
| | | $D_{00}$ | $D_{10}$ | $D_{20}$ | $D_{30}$ | $D_{40}$ | $D_{50}$ | $D_{60}$ | $D_{70}$ | | |
| | | $D_{01}$ | $D_{11}$ | $D_{21}$ | $D_{31}$ | $D_{41}$ | $D_{51}$ | $D_{61}$ | $D_{71}$ | | |

Fig.27

| | | $A_{06}$ | $A_{16}$ | $A_{26}$ | $A_{36}$ | $A_{46}$ | $A_{56}$ | $A_{66}$ | $A_{76}$ | | |
|---|---|---|---|---|---|---|---|---|---|---|---|
| | | $A_{07}$ | $A_{17}$ | $A_{27}$ | $A_{37}$ | $A_{47}$ | $A_{57}$ | $A_{67}$ | $A_{77}$ | | |
| $B_{60}$ | $B_{70}$ | $Q_{00}$ | $Q_{10}$ | $Q_{20}$ | $Q_{30}$ | $Q_{40}$ | $Q_{50}$ | $Q_{60}$ | $Q_{70}$ | $C_{00}$ | $C_{00}$ |
| $B_{61}$ | $B_{71}$ | $Q_{01}$ | $Q_{11}$ | $Q_{21}$ | $Q_{31}$ | $Q_{41}$ | $Q_{51}$ | $Q_{61}$ | $Q_{71}$ | $C_{01}$ | $C_{01}$ |
| $B_{62}$ | $B_{72}$ | $Q_{02}$ | $Q_{12}$ | $Q_{22}$ | $Q_{32}$ | $Q_{42}$ | $Q_{52}$ | $Q_{62}$ | $Q_{72}$ | $C_{02}$ | $C_{02}$ |
| $B_{63}$ | $B_{73}$ | $Q_{03}$ | $Q_{13}$ | $Q_{23}$ | $Q_{33}$ | $Q_{43}$ | $Q_{53}$ | $Q_{63}$ | $Q_{73}$ | $C_{03}$ | $C_{03}$ |
| $B_{64}$ | $B_{74}$ | $Q_{04}$ | $Q_{14}$ | $Q_{24}$ | $Q_{34}$ | $Q_{44}$ | $Q_{54}$ | $Q_{64}$ | $Q_{74}$ | $C_{04}$ | $C_{04}$ |
| $B_{65}$ | $B_{75}$ | $Q_{05}$ | $Q_{15}$ | $Q_{25}$ | $Q_{35}$ | $Q_{45}$ | $Q_{55}$ | $Q_{65}$ | $Q_{75}$ | $C_{05}$ | $C_{05}$ |
| $B_{66}$ | $B_{76}$ | $Q_{06}$ | $Q_{16}$ | $Q_{26}$ | $Q_{36}$ | $Q_{46}$ | $Q_{56}$ | $Q_{66}$ | $Q_{76}$ | $C_{06}$ | $C_{06}$ |
| $B_{67}$ | $B_{77}$ | $Q_{07}$ | $Q_{17}$ | $Q_{27}$ | $Q_{37}$ | $Q_{47}$ | $Q_{57}$ | $Q_{67}$ | $Q_{77}$ | $C_{07}$ | $C_{07}$ |
| | | $D_{00}$ | $D_{10}$ | $D_{20}$ | $D_{30}$ | $D_{40}$ | $D_{50}$ | $D_{60}$ | $D_{70}$ | | |
| | | $D_{01}$ | $D_{11}$ | $D_{21}$ | $D_{31}$ | $D_{41}$ | $D_{51}$ | $D_{61}$ | $D_{71}$ | | |

IMAGE PROCESSING APPARATUS

TECHNICAL FIELD

This invention relates to an image processing apparatus that processes a reconstructed image decoded from a compressed data of an original image.

BACKGROUND ART

In these days, the compression and coding technology for image data has progressed remarkably. The compression and coding technology is effective not only in an efficient use of a storage medium, but also in shortening the time for transmitting the image data through network. When original image is encoded at high compression ratio, it is general that the irreversible image compression method is adopted even though the reconstructed image is not accord perfectly with the original. It is designed in most of the irreversible image compression methods that an image data is divided into a plurality of blocks per M×N pixels unit, the orthogonal transform is performed in each block, the obtained orthogonal transform coefficient is quantized and then the image data is encoded. The typical irreversible image compression method is JPEG, which is widely in use as a compression method for color statistic images.

The outline of the encoding and decoding processing of JPEG compression is explained according to FIG. 1. In case of JPEG compression, a color transforming unit 10 transforms each pixel data consisting of multi-valued data (density data) of Red(R), Green(G), and Blue(B) to data of luminance component (Y) and color difference (Cr, Cb). There are many definitions of RGB space. But in case of sRGB space, one of the RGB space definitions, the transform from RGB data to YCrCb data is performed according to a following expression (Expression 1).

$Y=0.29900 \times R + 0.58700 \times G + 0.11400 \times B$ $Cr=0.50000 \times R - 0.41869 \times G - 0.08131 \times B + 128$ $CB=-0.16874 \times R - 0.33126 \times G + 0.50000 \times B + 128$     Expression 1

Next, a DCT unit 11 performs the Discrete Cosine Transform (DCT) of YCrCb data per 8×8 pixels block unit. Where a DCT coefficient after the transform is defined as DCT[v][u] and YCrCb data before the transform is defined as F[r][x], the DCT processing is performed according to a following expression (Expression 2). Besides, the above "x" indicates a position in the horizontal direction of the original image before the DCT processing in each block, the above "y" indicates a position in the vertical direction of the original image before the DCT processing in each block. And the above "u" indicates a position in the horizontal direction of the DCT coefficient after the DCT processing in each block, and the above "v" indicates a position in the vertical direction of the DCT coefficient after the DCT processing in each block.

$\text{DCT}[v][u] = \frac{1}{4} \times Cu \cdot Cv \cdot \Sigma\Sigma F[y][x] \cdot \cos((2x+1)u\pi/16) \cdot \cos((2y+1)v\pi/16)$ $Cu, Cv = 1/\sqrt{2} (u,v=0), 1$ (otherwise)     Expression 2

Besides, since the sensitivities of human eyes to the color difference component is lower than that to the luminance component, the compression ratio increases by sub-sampling the color difference component. In general, the sub-sampling is rendered to correspond one pixel of the color difference component to the luminance component for 2×2 pixels. Accordingly, after thinning out 8×8 pixels data from a block of 16×16 pixels unit, the DCT processing is performed.

Next, the quantizing unit 12 quantizes the DCT coefficient. Where the quantized DCT coefficient is defined as QDCT[v][u] and a value for quantizing each component of DCT coefficient is defined as Qtable[v][u], the quantization is performed according to a following expression (Expression 3).

$Q\text{DCT}[v][u] = \text{INT}\{\text{DCT}[v][u]/Q\text{table}[v][u] + 0.5\}$     Expression 3

But, a value of INT{a} is a maximum integer value not over a value a.

Besides, each value in a quantization table 13 can be adopted as a quantizing unit value used in the quantization of DCT coefficient corresponding to each frequency, and said value can be decided by the user's discretion. Generally, the sensitivities of human eyes to the high frequency component is lower than that to the low frequency component, therefore, the quantizing unit value to the high frequency component is relatively larger than that to the low frequency component. And the sensitivities of human eyes also to the color difference component are lower than that to the luminance component. Therefore, the quantizing unit value to the color difference component is relatively larger than that to the luminance component. For reference, the quantization tables recommended by the standard JPEG method are shown in FIG. 2 and FIG. 3. FIG. 2 shows the quantization table of the luminance component (Y), and FIG. 3 shows the quantization of the color difference component (Cr, Cb). Besides, since each quantizing unit value of the quantization table used by the quantization processing is required at the decoding, said values are stored in the encoded JPEG compressed data.

The quantized DCT coefficient is encoded by an entropy coding unit 14. Under the JPEG standard method, Huffman coding is used as the entropy coding.

The above-mentioned steps schematically explain about the encoding from the image data to the JPEG-compressed data. On the contrary, when the JPEG-compressed data is decoded to an image data, the process takes the inverse order to the above encoding steps. The following describes the decoding steps.

First, an entropy decoding unit 15 performs the entropy decoding of the JPEG-compressed data.

And, an inverse quantizing unit 16 performs the inverse quantization. At this time, the inverse quantizing unit 16 reads from the JPEG-compressed data the quantization table 13 used at the encoding, and respective quantizing unit values of the quantization table 13 are used as a value for inverse-quantizing each encoded component. That is to say, referring to an inverse quantization table 17 wherein inverse-quantizing unit values are the same as the quantizing unit value of the quantization table 13 used at the encoding, the inverse quantizing unit 16 performs the inverse-quantization of each encoded component using each inverse-quantizing unit value in the inverse quantization table 17. Where the inverse-quantized DCT coefficient is defined as RDCT[v][u], the inverse-quantization calculation is performed according to a following expression (Expression 4).

$R\text{DCT}[v][u] = Q\text{DCT}[v][u] \times Q\text{table}[v][u]$     Expression 4

Besides, since the inverse-quantized DCT coefficient according to the Expression 4 is calculated using the coefficient rounded up by the quantization of the encoding, it does not exactly reproduce the DCT coefficient obtained from the original image. However, the DCT coefficient obtained from the original image is ensured to be over a lower limit value dDCT[v][u] found by a following expression (Expression 5), and under a upper limit value pDCT[v][u] found by a following expression (Expression 6).

$$dDCT[v][u]=(QDCT[v][u]-0.5)\times Qtable[v][u] \quad \text{Expression 5}$$

$$pDCT[v][u]=(QDCT[v][u]+0.5)\times Qtable[v][u] \quad \text{Expression 6}$$

After the inverse-quantization is performed as described above, an inverse-DCT unit 18 performs the inverse-DCT. The inverse-DCT transforms the DCT coefficient to the YCrCb data. Where the YCrCb data after the inverse-DCT is defined as G[y][x], the inverse-DCT is performed according to a following expression (Expression 7).

$$G[y][x]=\tfrac{1}{4}\Sigma\Sigma Cu\cdot Cv\cdot RDCT[v][u]\cdot\cos((2x+1)u\pi/16)$$
$$\cdot\cos(2y+1)v\pi/16)\ Cu,\ Cv=1/\sqrt{2}(u,v=0),\ 1(\text{otherwise}) \quad \text{Expression 7}$$

In the final step, a color transforming unit 19 performs the color transform from YCrCb data to RGB data, in result a reconstructed image can be obtained. A following expression (Expression 8) is a transform expression used at the transforming from YCrCb data to sRGB data.

$$R=Y+1.40200\times(Cr-128)$$

$$G=Y-0.71414\times(Cr-128)-0.34414\times(Cb-128)$$

$$B=Y+1.77200\times(Cb-128) \quad \text{Expression 8}$$

The above steps are the outline of the encoding and decoding of the JPEG compression, but the quantizing step is included in the encoding step, and this degrades the data. The data degradation appears in the reconstructed image as noises, and the picture quality of the reconstructed image becomes worse than that of the original image. FIG. 4 shows an example of the original image, and FIG. 5 shows an example of the reconstructed image decoded from the JPEG-compressed data of the original image.

One of noises seen in the reconstructed image is a mosquito noise shown in FIG. 5 that has a bad visual influence. The mosquito noise is the gradation fluctuation; it seems that mosquitoes are flying around edges of the reconstructed image. Most of the high frequency components drop out due to the quantization of DCT coefficient, so that strong edges existed in the original image cannot be reconstructed exactly, with the result that the gradation fluctuation appears.

And another noise is a block distortion shown in FIG. 5. The block distortion is a phenomenon that the block boundary of the reconstructed image has the discontinuous gradation due to the encoding per block of 8×8 pixels. Such noise appears remarkably in areas of which gradation value changed gradually in the original image.

One of the prior art of removing these noises is the filtering (the smoothing), and by performing the filtering of a reconstructed image the obstructive mosquito noise and block distortion appearing in the reconstructed image are removed. Where the reconstructed image is uniformly subjected to the smoothing by means of such method, the noise can be reduced. However, true edges in the original image get dull, and the reconstructed image becomes blurred.

The method to avoid the unexpected blurred image is disclosed in Japanese Patent No. 2,962,815, namely, at the time of encoding the original image, the compressed data is added with information for specifying a block of which boundary is at the same position of true edge of the original image(edge block). And at the decoding, the blocks in the reconstructed image are divided to the edge blocks and the others. The other blocks are processed so as to remove the bock distortion therefrom, and the edge blocks are processed so as to remain the edge.

However, in the above prior art disclosed in the Japanese Patent No. 2,962,815, when the original image is encoded, the information specifying the edge block must be added to the compressed data. Therefore, the encoding apparatus should be provided with both a function for specifying the edge block and a function for adding said identifying information to the compressed data.

Another method is also suggested besides the above prior art, in which the above mentioned particular functions are not added to the encoding apparatus but functions are added to the decoding apparatus, and said method can restrict to degradation of the true edge of the original image. That is to say, the block distortion and the mosquito noise are removed with controlling the occurrence of the blurring in the image. A particular one of the effective methods is the Projection Onto Convex Set method (POCS method). The POCS method is the iteration of the smoothing and the restricted condition-based projection method by turns. Here is described the processing of the POCS method according to FIG. 6.

After a DCT unit 20 performs the DCT processing of the reconstructed image decoded from the JPEG compressed data, a restriction condition calculating unit 21 calculates restriction conditions for the projection processing. The restriction condition is to restrict respective DCT coefficients of blocks composing a final outputted image within the range of DCT coefficients that the original image might have involved.

In the steps from the JPEG encoding to the decoding, the DCT coefficient is quantized. And the DCT coefficient before DCT processing is assured to be the lower limit value dDCT[v][u], and under the upper limit value pDCT[v][u]. Therefore, as the restriction condition for the projection processing, the restriction condition calculating unit 21 calculates the lower limit value dDCT[v][u] and the upper limit value pDCT[v][u], the deference of the two values indicating the variable range of DCT coefficients (see Expressions 5 and 6).

The following explains a processing for removing the noise from the reconstructed image by the iteration of the projection processing and the smoothing by returns using the restriction condition calculated by the restriction condition calculating unit 21 (the lower limit value dDCT[v][u] and the upper limit value pDCT[v][u]).

A smoothing unit 22 smoothes the reconstructed image uniformly by the filtering. The smoothed image data is subjected to the color transform to YCrCb data by the color transforming unit 23, and then to the DCT processing by the DCT unit 24.

The obtained DCT coefficient is subjected to the projection processing by a projecting unit 25 according to the lower limit value dDCT[v][u] and the upper limit value pDCT[v][u] calculated by the restriction condition calculating unit 21. That is to say, where a DCT coefficient calculated by the DCT unit 24 is less than the lower limit value dDCT[v][u] or more than the upper limit value pDCT[v][u], the DCT coefficient is rounded up to the variable range limit value. That is to say, where the DCT coefficient is less than the lower limit value dDCT[v][u], the projecting unit 25 replaces the DCT coefficient with the lower limit value dDCT[v][u]. And where the DCT coefficient is over the upper limit value pDCT[v][u], the projecting unit 25 replaces the DCT coefficient with the upper limit value pDCT[v][u].

After the rounded DCT coefficient is subjected to the inverse-DCT processing by an inverse-DCT unit 26, a color transforming unit 27 performs the color transforming from YCrCb data to RGB data.

An end deciding unit 28 decides whether the noise removal processing is terminated or not. If it is decided that the processing is continued, the respective composing units from the smoothing unit 22 to the color transforming unit 27 performs the same processing again.

By much iteration of the smoothing and the projection processing based on the restriction condition, the block distortion and the mosquito noise can be removed satisfactorily, however, the true edge of the original image gets dull and the blurring of the image gets worse.

Therefore, the number of times the above mentioned processing iteration, which enables to remove the block distortion and mosquito noise with controlling the dullness of the true edge in the original image, is set in advance to the end deciding unit 28. The end deciding unit 28 decides the termination after iterating the smoothing and the projection processing the predetermined number of times. In result, since the POCS processing controls the dullness of the true edge, it is possible to removes the block distortion and mosquito noise in the reconstructed image.

An image shown in FIG. 7 is an image obtained by processing the reconstructed image in FIG. 5 using the conventional POCS method. FIG. 7 shows the fact that the iteration of the smoothing and the projection processing based on the restriction conditions enables to reduce the noise in the reconstructed image without apparent dull.

Besides, instead of the predetermined number of times, the end deciding unit 28 may decide the termination of the above iteration processing according to a value obtained by the evaluation of the image. For instance, the end deciding unit 28 may decide the termination of the iteration processing when the changing value of the image becomes small after the above iteration processing. To be concrete, where an image processed k times is defined as $f_k(x, y)$ and an image processed k+1 times as $f_{k+1}(x, y)$, the changing value E of the image after k+1 times processing can be found by a following expression (Expression 9

$$E = \sum_{x,y} \{f_{k+1}(x, y) - f_k(x, y)\}^2 \qquad \text{Expression 9}$$

When it found this changing value E is under a specific value, the end deciding unit 28 decides the termination of the above iteration processing.

However, in the noise removal processing of the POCS method, the whole image is smoothed uniformly by the same filter; therefore a blurring in some degree appears in the reconstructed image. That is to say, as shown in FIG. 7, the true edge in the original image becomes dull.

In order to settle this problem, the next prior art is designed that the reconstructed image is divided into some areas in consideration with the edges, and the respective areas are subjected to the smoothing using different filters.

Japanese Patent Publication No. 7-170518 discloses that the image is divided into a plurality of small areas by combining neighboring pixels if the difference between the neighboring pixels is less than a specific value (such small area is different from a block, and not always in the same size), and the smoothing is performed per area. According to such method, since the areas are divided at the edge, the smoothing is not performed traversing the edge. Therefore it is possible to obtain an effect that the blurring of the edge is made relatively small.

However, in the above method, there is a possibility that the image is divided to areas also based on the discontinuity of gradation generated as the block distortion on the block boundary. In such case, the block distortion cannot be reduced and removed.

Therefore, this invention considers the above conventional problems and has an object to provide an image processing apparatus enables to remove the block distortion with controlling the blurring on the edge.

The block distortion removal processing disclosed in Japanese Patent No. 2,962,815 is explained here according to FIG. 8.

In the disclosed block distortion removal processing, according to the block specifying information added to the compressed data, blocks to be removed block distortion therefrom are specified from the reconstructed image. In the following explanation, a target block x shown in FIG. 8 is specified as a block to which the block distortion removing is executed.

And as shown in FIG. 8, a corner a of the target block x consists of pixel a1, a2, a3 and a4, said pixel a1 in the target block, said respective pixels a2, a3, and a4 in blocks L, LU, and U neighboring to the target block x. The value of pixel a1 is presumed by averaging all the values of pixels a1, a2, a3, and a4. And a value calculated by subtracting the value of pixel a1 of the reconstructed image from the presumed value of pixel a1 is considered as a correction value of the pixel a1.

Likewise, regarding the other three corners b, c and d of the target block x, correction values for respective pixels b1, c1, and d1 are calculated.

Then, each correction value of pixels in the target block x are calculated by weighting and averaging the correction values of pixels a1, b1, c1 and d1 according to the respective distances from the pixels a1, b1, c1 and d1. And the respective calculated correction values of pixels are added to the values of the corresponding pixels; thereby a block distortion reduced image can be reconstructed.

According to such method, it is possible to obtain the reconstructed image wherein the block distortion is reduced. However, it result in that the value of corner pixel in the target block x and the other values of corner pixels of neighboring blocks are the same one. That is to say, regarding the corner a, the value of pixel a1 of the target block x and the other values of pixels a2, a3, and a4 of the blocks L, LU, U are the same one. Hereupon, the block distortion can be reduced, but the pixels surrounding a corner of block have the same one value, in result the smoothing gradation change over each corner of the block could not obtain.

Therefore, considering the above problems, the present invention also has an object to an image processing apparatus enables to reconstruct the smoothing gradation change over corners of blocks composing the reconstructed image and remove the block distortion.

Japanese Patent Publication No. 8-2184309 discloses a method of filtering the reconstructed image by changing the smoothing filter according to the compression ratio of the compressed data to the original image. It is sure that visually bad influences based on the noises like the mosquito noise and the block distortion depends on the compression ratio of the compressed data to the original image, and also depends on the output size of the reconstructed image. That is to say, when the reconstructed image is enlarged and outputted for the printing output and the screen display, the above-mentioned noises stand out awfully, and visually bad influences appear extremely. On the contrary, when the reconstructed image is outputted as a scale-down image, the noises do not stand out and the visually bad influence gets small.

If the noise removal processing is performed without considering those effects, the noises cannot be removed sufficiently. Otherwise, unnecessary big blurring occurs.

Therefore, the invention has an object to provide an image processing apparatus that removes the noises efficiently corresponding to the output of the reconstructed image considering the magnifying ratio at the output of the reconstructed image.

Disclosure of Invention

In order to achieve the above objects, the image processing apparatus in the present invention for a reconstructed image decoded from a compressed data of an original image comprises an area specifying unit for specifying a block distortion area to remove a block distortion therefrom on the reconstructed image. And the image processing apparatus also comprises a block distortion area noise removing unit for removing noises from the block distortion area specified by the area specifying unit.

The image processing method in the invention for a reconstructed image decoded from a compressed data of an original image comprises a step of specifying a block distortion area on the reconstructed image. And the image processing method of the invention also comprises a step of removing noises from the block distortion area specified in the step of specifying the area.

The image processing apparatus in the present invention for a reconstructed image decoded from a compressed data of an original image comprises a magnifying ratio detecting unit for detecting the magnifying ratio of an output image to the reconstructed image, and a noise removing unit for removing noises of the reconstructed image according to the magnifying ratio detected by the magnifying ratio detecting unit. And the image processing apparatus also comprises an image enlarging unit for enlarging the reconstructed image from which the noise removing unit removes the noises, according to the magnifying ratio.

The image processing method comprises a step of detecting the magnifying ratio of an output image to the reconstructed image, and a step of removing noises of the reconstructed image according to the magnifying ratio detected by the magnifying ratio detecting unit. And the image processing method also comprises a step of magnifying the reconstructed image from which the noise removing unit removes the noises, according to the magnifying ratio.

BRIEF DESCRIPTION OF DRAWINGS

This application contains four (4) drawings executed in color. A copy of this application with three (3) copies of color drawings is provided along with the necessary fee.

FIG. 2 shows a quantization table for the luminance components that is recommended by the JPEG standard.

FIG. 3 shows a quantization table for the color difference components that is recommended by the JPEG standard.

FIG. 10 is a diagram explaining a method of specifying a block distortion area.

FIG. 11 is a diagram explaining a method of specifying a block distortion area.

FIG. 16 is a diagram explaining a pixel value in a target block distortion area X.

FIG. 20 is a diagram showing an example of a filter deciding table.

FIG. 21 is a diagram showing an example of a filter deciding table.

FIG. 22 is a diagram showing an example of a filter deciding table.

FIG. 25 is a diagram explaining the block distortion removing.

FIG. 27 is a diagram explaining the block distortion removing processing.

BEST MODE FOR CARRYING OUT THE INVENTION

Here are explained preferred embodiments of this invention according to drawings.

Embodiment 1

The following explains an image processing apparatus of the first embodiment of the invention.

Figure 9:
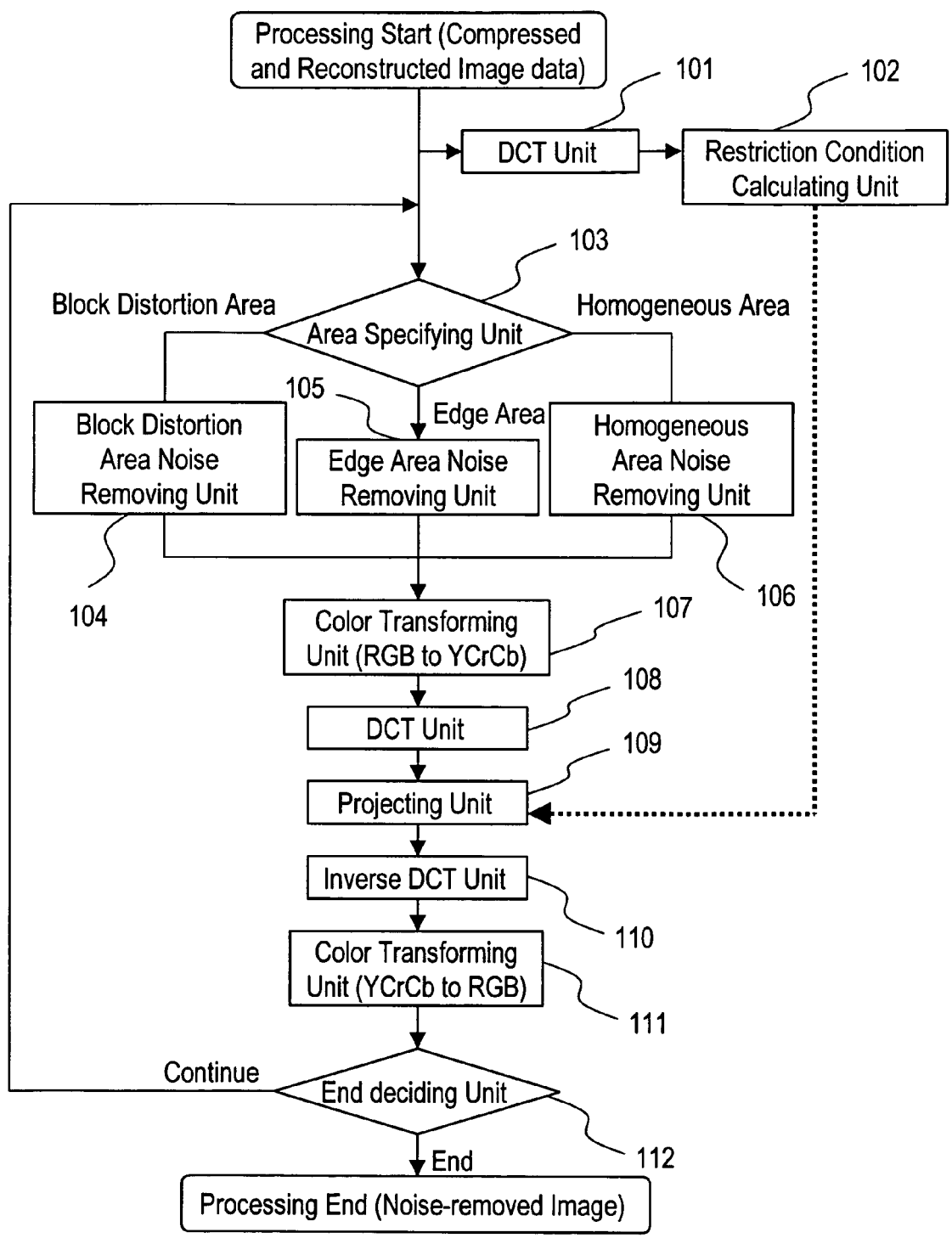
FIG. 9 is a diagram showing the configuration and processing flow of the image processing apparatus in the first embodiment.

FIG. 9 shows a configuration and processing flow of the image processing apparatus of the first embodiment. Like the conventional POCS method, a DCT unit 101 transforms a reconstructed image decoded from the JPEG compressed data by the Discrete Cosine Transform (DCT). A restriction condition calculating unit 102 calculates restriction conditions for the projection processing. Besides, the calculated restriction condition is the same as that of the general POCS processing. The processing in the first and second embodiments adopts the Discrete Cosine Transform as one of the orthogonal transform methods. Accordingly, a DCT coefficient becomes an orthogonal transform coefficient in the first and second embodiments.

On the other hand, an area specifying unit 103 specifies a "block distortion area", an "edge area", and a "homogeneous area" in the reconstructed image decoded from the JPEG compressed data. That is to say, the area specifying unit 103 divides the reconstructed image into three areas, the "block distortion area", the "edge area" and the "homogeneous area", by specifying first the "block distortion area" in the reconstructed image, and secondarily specifying the "edge area" in the other area except the block distortion area, and finally specifying the remained area as the homogeneous area.

The following relates to a method of specifying said three areas. In JPEG encoding, the color difference component is sub-sampled and the quantization table for the color difference component is set to be higher values than that for the luminance component. In result, the information of color difference component in the reconstructed image degrades extremely comparing with that of the luminance component. Accordingly, in the first embodiment, the RGB color data of the reconstructed image is transformed in color to YCrCb data, and the above "block distortion area", "edge area" and "homogeneous area" are specified by means of only the luminance component (Y) of said data.

The method of specifying the block distortion area is as follows. As described in the JPEG encoding, an area to be corrected by an obstructive block distortion cause is an area with a soft change of the graduation value in the original image; namely, the area does not contain much high frequency component. Therefore, the area specifying unit 103 transforms all the blocks in the reconstructed image by DCT, and then specifies, as the block distortion area, a block wherein all the DCT coefficients over a specific frequency (degree) are less than a predetermined value. For example, the area specifying unit 103 decides that a block as shown in FIG. 10 in which all the DCT coefficients over the third degree are 0 is the block distortion area.

When the blocks specified as the block distortion area by the above method are subjected to the noise removal processing described later, if the high frequency is contained in any blocks neighboring to the specified block, each correction value in pixels within the specified block sometimes becomes improper due to the mosquito noises in the neighboring blocks.

Therefore, to avoid such problem, the area specifying unit 103 is preferable to specify the block distortion area as follows: of blocks wherein all the DCT coefficients over a specific frequency (degree) are less than predetermined value, those surrounded only by the blocks wherein all the DCT coefficients over a specific frequency (degree) are less than a predetermined value are specified as the block distortion area. For example, the area specifying unit 103 should decide to specify as the block distortion area the blocks surrounded by only the blocks satisfying the condition shown in FIG. 10 among the blocks satisfying the condition shown in FIG. 10.

Figure 11:
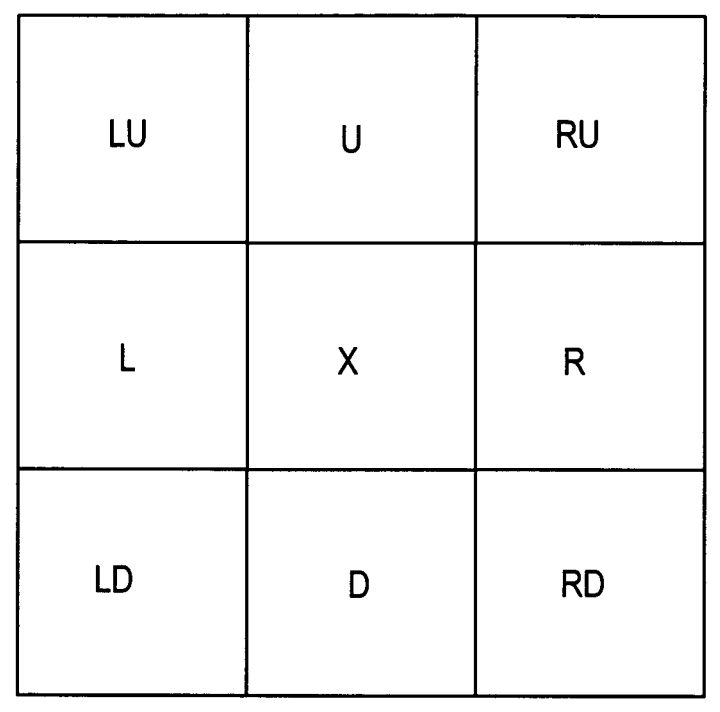

The specifying method is explained supplementary according to FIG. 11. In FIG. 11, a target block X is defined as a block wherein all the DCT coefficients over a specific frequency (degree) are less than a predetermined value. That is to say, the DCT coefficients in the target block X are arbitrary values for the direct current components, the first-degree components, and the second-degree components; and 0 for the alternate current components over the third-degree, as shown in FIG. 10. In this case, regarding 8 blocks, LU, U, RU, L, R, LD, D, and RD surrounding the target block X, when all of them are the block wherein all the DCT coefficients over a specific frequency (degree: the third degree of the block shown in FIG. 10) are less than a predetermined value like the target block X, said blocks are specified as the block distortion area by the area specifying unit 103.

Figure 12:
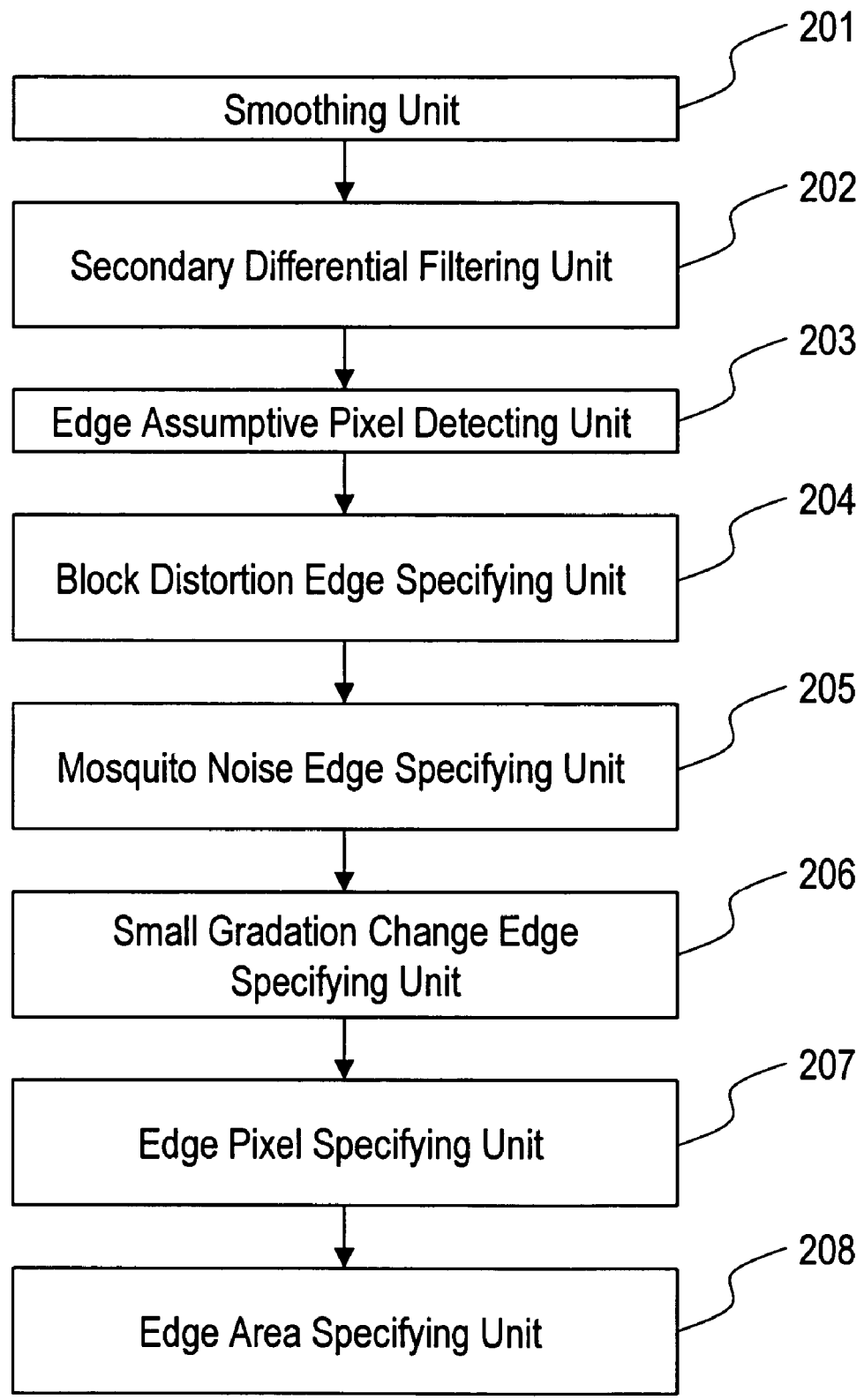
FIG. 12 is a diagram explaining a method of specifying an edge area.
Figure 13:
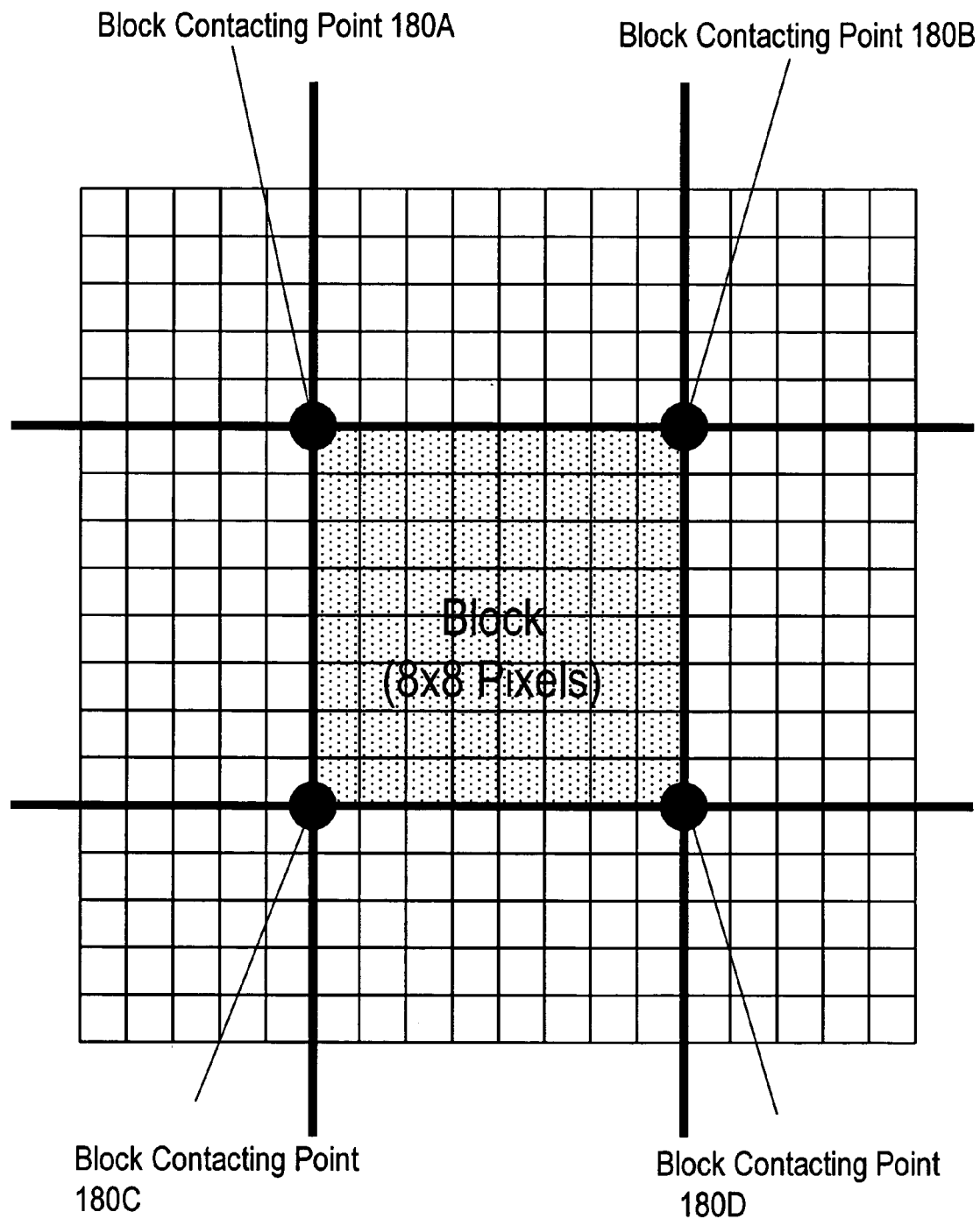
FIG. 13 is a diagram explaining a block contacting point.

After specifying the block distortion area as above, the area specifying unit 103 specifies the edge area in the reconstructed image. The following is an explanation about the method of specifying the edge area by the area specifying unit 103 referring to FIG. 12. FIG. 12 is a diagram showing configuration units in the area specifying unit 103 for specifying the edge area.

First, a smoothing unit 201 smoothes the reconstructed image decoded from the JPEG compressed data using the Gaussian filter. The smoothing is for reducing a lot of noises included in the reconstructed image.

Next a secondary differential filtering unit 202 performs the secondary differential filtering (for example the Laplacian filtering) of the image smoothed by the smoothing unit 201, and then an edge assumptive pixel detecting unit 203 detects an edge assumptive pixel by the zero crossing detection. The zero crossing detection can detect a center of the edge precisely.

Now, the edge assumptive pixels include a number of pixels with edge components caused from the block distortion and the mosquito noise. This is based on the detecting method of the edge assumptive pixel detecting unit 203. When the values resulted from the secondary differential filtering (the result of the Laplacian filtering, for example) shows a positive value changed to a negative value or a negative value changed to a positive value between neighboring pixels, the edge assumptive pixel detecting unit 203 never fail to detect all of such pixels as edge assumptive pixel, using the zero crossing detection. And even if the gradation change is very small, when it is decided after the secondary differential filtering that the pixel has a value changing from positive to negative or from negative to positive, the edge assumptive pixel detecting unit 203 decides that all of said pixels are the edge assumptive pixels.

Therefore, it is necessary to specify true edge pixels existing in the original image by excluding edge assumptive pixels caused from the block distortion and the mosquito noise and having very small gradation change from the edge assumptive pixels detected by the edge assumptive pixel detecting unit 203.

First, a block distortion edge specifying unit 204 specifies edge assumptive pixels caused from the block distortion among the edge assumptive pixels detected by the edge assumptive pixel detecting unit 203. For example, the block distortion edge specifying unit 204 decides that the edge assumptive pixels positioned around the block boundary but not neighboring to the other edge assumptive pixels within the block should be the edge assumptive pixels.

Next, a mosquito noise edge specifying unit 205 specifies edge assumptive pixels caused from the mosquito noise among the edge assumptive pixels detected by the edge assumptive pixel detecting unit 203. If there is a strong edge in a block of the original image, the reconstructed image has a very small gradation change around the true edge, that is, the mosquito noise. Therefore, if the same block has both edge assumptive pixels with relatively high edge strength and edge assumptive pixels with relatively low edge strength, there is a high possibility that the pixels with lower edge strength might be those caused from the mosquito noise.

Therefore, the mosquito noise edge specifying unit 205 checks the continuity of each edge assumptive pixel detected in the block and 4 neighboring pixels to said detected pixel. To be concrete, the mosquito noise edge specifying unit 205 checks pixels positioned at upper, lower, left and right of the detected edge assumptive pixel. If there is any edge assumptive pixel in those pixels, they are decided to be interconnected each other. In result of checking the continuity of all the edge assumptive pixels in the block and respective 4 neighboring pixels, a unit of edge assumptive pixels interconnecting in the block is called interconnecting edge object. If there are a plurality of interconnecting edge objects in the same block, the mosquito noise edge specifying 205 calculates each edge strength of the edge assumptive pixel by using the Sobel Filter, and then calculates an average value for every interconnecting edge object. When it is decided that the interconnecting edge object in the same block has the edge strength relatively under a predetermined ratio of the calculated average value, all the pixels in the interconnecting edge object are specified as the edge assumptive pixel caused from the mosquito noise by the mosquito noise edge specifying unit 205. For example, when the interconnecting edge object has the average value of the edge strength under 80% of the highest average value of the edge strength in the same block, the mosquito noise edge specifying unit 205 specifies as the edge assumptive pixel caused from the mosquito noise all the pixels composing the interconnecting edge object.

Next, a small gradation change edge specifying unit 206 specified an edge assumptive pixel of which absolute edge strength is under a predetermined value, as a small gradation change pixel, among the edge assumptive pixels detected by the edge assumptive pixel detecting unit 203. For example, the small gradation change edge specifying unit 206 calculates the edge strength of each edge assumptive pixel by the Sobel Filter processing, and specifies pixels with the edge strength under the predetermined value as the small gradation change pixel.

And among the edge assumptive pixels detected by the edge assumptive pixel detecting unit 203, an edge pixel specifying unit 207 specifies, as an edge pixel, the pixels other than the edge assumptive pixels caused from the block distortion specified by the block distortion edge specifying unit 204, the edge assumptive pixels caused from the mosquito noise specified by the mosquito noise edge specifying unit 205, and the small gradation change pixels specified by the small gradation change edge specifying unit 206.

Next, an edge area specifying unit 208 specifies an edge area in the reconstructed image according to the edge pixels specified by the edge pixel specifying unit 207. The edge pixel specified by the edge pixel specifying unit 207 is positioned at the center of the edge, and the neighboring pixels to this pixel have a possibility that said pixel had the comparatively sharp gradation change in the original image. Therefore, the edge area specifying unit 208 specifies as the edge area an area consisting of a plurality of pixels within a specific distance from the edge pixels specified by the edge pixel specifying unit 207.

In general, the method of detecting the edge is to detect an area with the sharp gradation change value according to the value obtained by the filtering like the Sobel Filter. When this method is applied to the JPEG reconstructed image, the method detects as the edge not only the true edge in the original image but also the difference and the fluctuation of the gradation caused from the block distortion and the mosquito noise. However, the edge specifying method described in this embodiment makes it possible to specify only the edge included in the original image.

Besides, the invention is designed that the bock distortion edge specifying unit 204 specifies the edge assumptive pixels caused from the block distortion, then the mosquito noise edge specifying unit 205 specifies the edge assumptive pixels caused from the mosquito noise, and then the small gradation change edge specifying unit 206 specifies the small gradation change pixels. However, the sequence of the processing of specifying the edge assumptive pixels caused from the block distortion, the edge assumptive pixels caused from the mosquito noise, and the small gradation change pixels, is not limited to this.

Now, after the area specifying unit 103 specifies the block distortion area and the edge area as mentioned above, the area specifying unit 103 specifies as a homogeneous area an area which does not belong to either the block distortion area or the edge area in the reconstructed image. The homogeneous area consists of an area wherein the mosquito noise generates and an area wherein the gradation change value is comparatively smooth in the reconstructed image.

After the area specifying unit 103 specifies the block distortion area, the edge area, and the homogeneous area in the reconstructed image as described above, the block distortion area noise removing unit 104, the edge area noise removing unit 105, and the homogeneous noise removing unit 106 perform respectively the image processing corresponding to the block distortion area, the edge area, and the homogeneous area.

The following explains about the processing executed by the block distortion area noise removing unit 104, the edge area noise removing unit 105, and the homogeneous area noise removing unit 106.

First, here is explained the processing of the block distortion area noise removing unit 104. The block distortion area with the obstructive block distortion is an area wherein the gradation change was smooth in the original image, as described above. Since the encoding is performed per block independently, the gradation continuity cannot be kept on the boundary portion of the neighboring blocks due to the quantization, and it results in the block distortion. The smoothing of the simple filtering to remove the block distortion cannot remove the gradation continuity. Accordingly, the proper processing is required to remove the block distortion effectively.

Then, the following explains the block distortion removing method of removing the block distortion effectively adapting the pixel interpolation. The steps of the block distortion removing method in the first embodiment are explained here according to FIG. 13 to FIG. 16.

In the block distortion removing method of the first embodiment, when the reconstructed image is divided into blocks per 8×8 pixels unit, a point of contact of 4 blocks is called a block contacting point. This point is corresponding to a block contacting point 180 (180A to 180D) in FIG. 13. And the virtual pixel density (the pixel value) on each block contacting point 180 is called the block contacting point pixel density.

Figure 14:
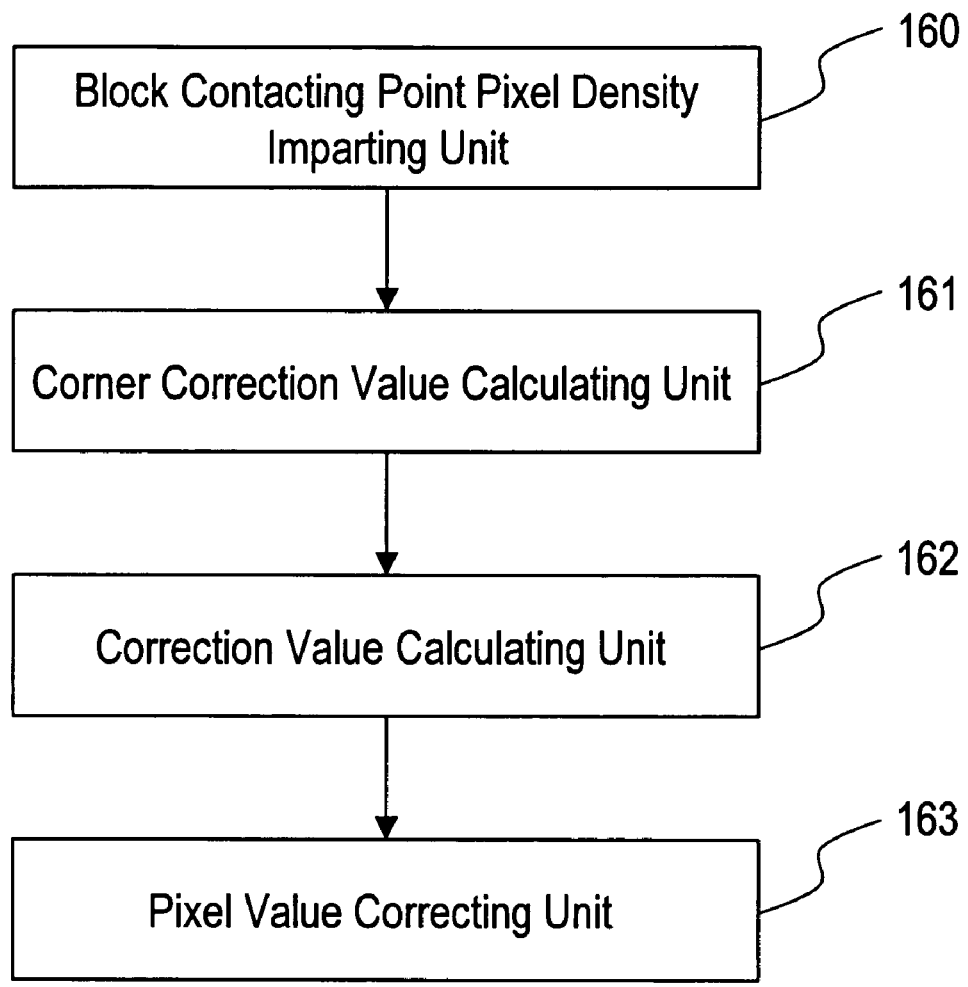
FIG. 14 is a diagram showing an internal structure of a block distortion area noise removing unit 104.

The internal structure of the block distortion area noise removing unit 104 is shown in FIG. 14. A block contacting point pixel density imparting unit 160 calculates the block contacting point pixel density. The block contacting point pixel density is imparted individually from respective 4 blocks neighboring to each block contacting point 180 of the block distortion area specified by the area specifying unit 103. That is to say, four values of the block contacting point pixel density are imparted to each block contacting point 180.

Figure 15:
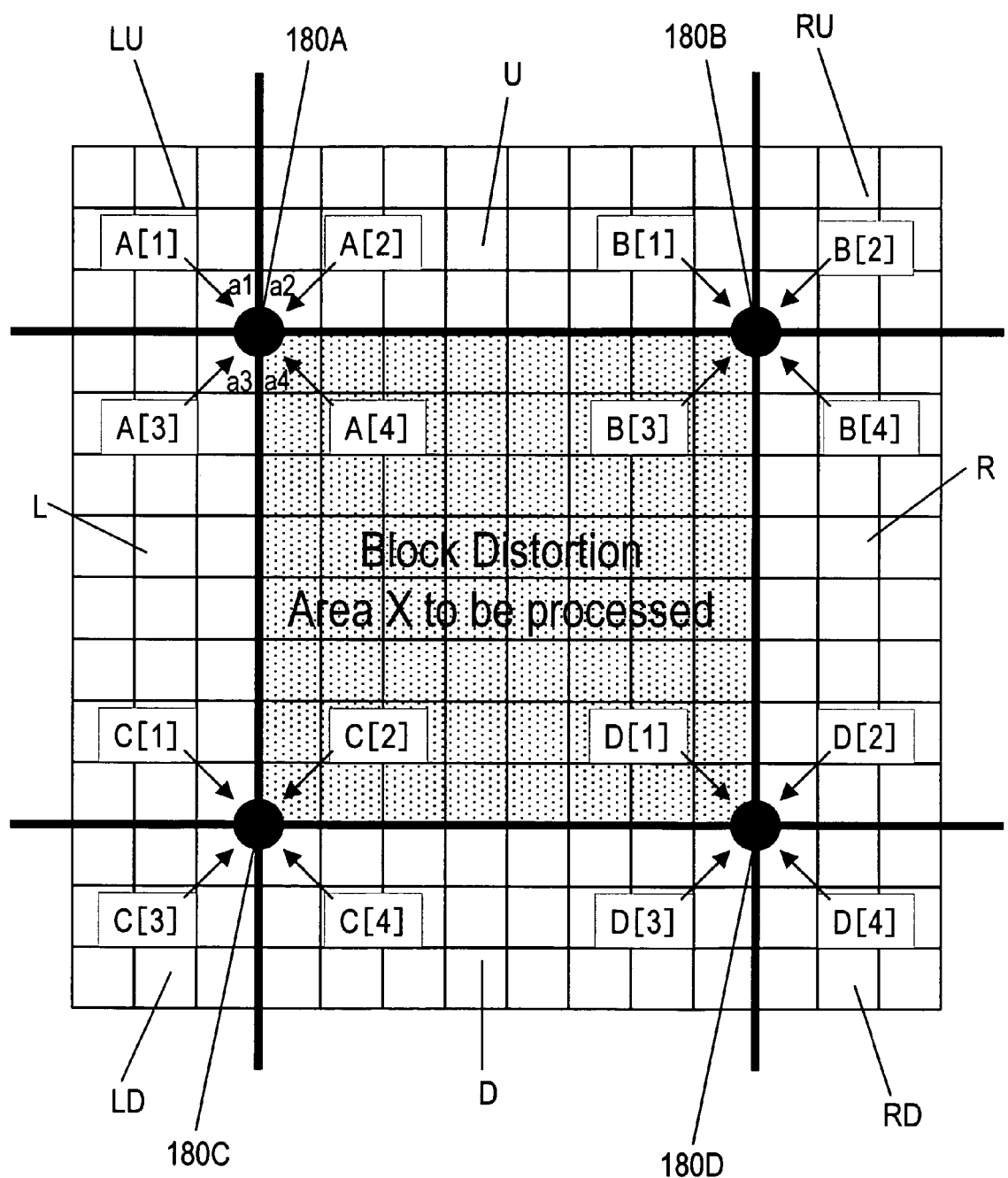
FIG. 15 is a diagram explaining the pixel density of the block contacting point.

According to FIG. 15, the block contacting point pixel density is explained concretely. FIG. 15 expresses a status that a block distortion area X to be processed (a block of 8×8 pixels) is surrounded by 8 block distortion areas LU, U, RU, L, R, LD, D, RD (a bock of 8×8 pixels). The block contacting point 180 (180A to 180D) exists on each corner of the block distortion area X.

Regarding the block contacting point 180A, the block contacting point pixel density A[4], which is calculated based on the pixels included in the block distortion area X, is imparted to the block contacting point 180A. And the block contacting point pixel density A[1] calculated based on the pixels included in the block distortion area LU on the upper left of the block distortion area X, the block contacting point pixel density A[2] calculated based on the pixels included in the block distortion area U on the upper of the block distortion area X, and the block contacting point pixel density A[3] calculated based on the pixels included in the block distortion area L on the left of the block distortion area X are imparted also to the block contacting point 180A.

As described above, the respective block contacting point 180(180A to 180D) is given four values of the block contacting point pixel density calculated from respective pixels in four blocks contacting with the block contacting point 180.

The method of calculating the block contacting point pixel density is described hereinafter. The block contacting point pixel density imparting unit 160 calculates the pixel density of the block contacting point by weighting and averaging the pixels within a specific distance from the block contacting point 180 according to a reciprocal of the distance from the block contacting point 180.

For instance, the distance between each center of neighboring pixels is defined as 1. Regarding 4 pixels a1, a2, a3 and a4 surrounding the block contacting point 180A, the distance between the pixels a1 and a2 is 1, the distance between the pixels a2 and a4 is 1, and the distance between the pixels a4 and a3 is 1. In this case, the block contacting point density imparting unit 160 weights the pixels within 2 of the Euclidian distance by the reciprocal of the Euclidian distance, and calculates the average value of them, and imparts said calculated value to the block contacting point 180 as the pixel density. For instance, by using the pixel value within the block distortion area X, a following expression (Expression 10) can calculate the block contacting point pixel density A[4] on the block contacting point 180A.

$$A[4]=\sqrt{2}\times f(0,0)+\sqrt{2}/\sqrt{5}\times(f(1,0)+f(0,1))/(\sqrt{2}+\sqrt{2}/\sqrt{5}+\sqrt{2}/\sqrt{5}) \quad \text{Expression 10}$$

Besides, f(0,0), f(1,0), and f(0,1) are the pixel values within 2 of the Euclidian distance from the block contacting point 180A of the block distortion area X shown in FIG. 16.

In such way, the block contacting point pixel density imparting unit 160 imparts respective 4 values of the block contacting point pixel density to the 4 block contacting points 180A to 180D of the block distortion area X.

Next, a corner correction value calculating unit 161 calculates each correction value of the block contacting point 180 by using the imparted block contacting point pixel density of the block contacting point 180. The each correction value of the block contacting point 180 is called a block contacting point pixel density correction value hereinafter. The corner correction value calculating unit 161 calculates the block contacting point pixel density correction value by subtracting the calculated block contacting point pixel density (A[4] of the block contacting point 180A, for example) from an average of 4 pixel density values of the block contacting point (A[1] to A[4] of the block contacting point 180A, for example).

Taking the method of calculating the block contacting point pixel density correction value of the block contacting point 180A for example, the method is explained here. Where the block contacting point pixel density correction value of the block contacting point 180A is defined as dA, the block contacting point pixel density correction value dA is calculated according to a following expression (Expression 11).

$$dA=[(A[1]+A[2]+A[3]+A[4])/4]-A[4] \quad \text{Expression 11}$$

Next, a correction value calculating unit 162 calculates each correction value of the pixels in the block distortion area X (a pixel correction value) according to the block contacting point pixel density correction value calculated of the block contacting point 180. That is to say, respective block contacting point pixel density correction values of the block contacting points 180A to 180D are defined as dA, dB, dC, and dD. The correction value calculating unit 162 calculates a correction value of a pixel in the block distortion area X (a pixel correction value) by weighting and averaging the respective dA, dB, dC and dD by the reciprocal of Euclidian distance between the block contacting points 180A to 180D and the center of the pixel in the block distortion area X.

Where the correction value of the pixel positioned at f(x,y) in FIG. 16 is defined as g(x,y), said g(x,y) is calculated according to a flowing expression (Expression 12).

$$g(x,y)=(wA\times dA+wB\times dB+wC\times dC+wD\times dD)/(wA+wB+wC+wD)$$

$$wA=1/\sqrt{(x+0.5)\times(x+0.5)+(y+0.5)+(y+0.5)}$$

$$wB=1/\sqrt{(7.5-x)\times(7.5-x)+(y+0.5)+(y+0.5)}$$

$$wC=1/\sqrt{(x+0.5)\times(x+0.5)+(7.5-y)+(7.5-y)}$$

$$wD=1/\sqrt{(7.5-x)\times(7.5-x)+(7.5-y)+(7.5-y)} \quad \text{Expression 12}$$

Next, a pixel value correcting unit 163 adds the pixel correction value g(x,y) calculated according to the above expression 12 to respective corresponding pixel values in the block distortion area X, with the result that new pixel values can be obtained. In such way, the noise is removed from the block distortion area.

The above-mentioned block distortion removing process has much effect on removing the block distortion appearing in the area wherein the gradation changes smoothly.

By using the above block distortion removing process, four pixel values of the pixels surrounding each corner of the block distortion area X will not be the same one. In result, the smoothing gradation change can be realized even in the corner of the block.

Besides, as described in the steps of specifying the block distortion area by the area specifying unit 103, it is preferable as for the blocks to be specified as the block distortion area that the area specifying unit 103 specifies as the block distortion area the blocks surrounded by only the blocks wherein all the DCT coefficients over a specific frequency (degree) are less than a predetermined value.

It is unlikely that the edge is included in the blocks neighboring to the block distortion area specified in such way. Though there are often the mosquito noises around the edge, if the block does not include the edge, it is unlikely that the mosquito noise exists in the block. Therefore, the block neighboring to the thus specified block distortion area has hardly any local improper pixel value regarding the pixel near to the block contacting point due to the mosquito noise. In result, it is possible to prevent the block contacting point pixel density correction value from being an improper value.

All the color components can be corrected by performing the above block distortion removing process per unit of each RGB component of the reconstructed image.

Next explanation relates to the processing of the edge area noise removing unit 105. The edge area noise removing unit 105 processes each color components of the pixels in the edge area specified by the area specifying unit 103, said edge area consisting of the true edge pixels in the original image and the surrounding pixels, by the edge-preserving smoothing such as the median filtering and reduces the noises with preserving the edge.

When the pixels of the edge area is subjected to the simple strong smoothing that makes the average of 3×3 pixels a new pixel value, for example, the true edge of the original image is made to be blurred, and the sharpness of the whole image is lost. Accordingly, the edge area noise removing unit 105 processes the edge area by the edge-preserving smoothing like the median filtering, and removes the noises with preserving the edge.

Next, the processing of the homogeneous area noise removing unit 106 is explained here. The homogeneous area specified by the area specifying unit 103 comprises the area wherein the mosquito noise appears in the reconstructed image and the area wherein the gradation value changes smoothly relatively. In the smooth gradation change area, the values of the neighboring pixels are close each other, therefore even when the strong smoothing is performed, the pixel values change very little and the influence on the picture quality is small. Then, the homogeneous noise removing unit 106 processes each RGB color component of pixels in the homogeneous area by the smoothing using FIR (Finite Impulse Response) or the strong smoothing making a simple average of neighboring 3×3 pixels a new pixel value, so that the mosquito noise can be reduced.

Analyzing a reconstructed image, dividing the reconstructed image into three areas, the "block distortion area", the "edge area" and the "homogeneous area", and performing the noise removing appropriate to respective areas as mentioned above, those steps makes it possible to remove the noise effectively. In particular, it is possible to effectively remove the sharp block distortion appeared on a reconstructed image decoded from a compressed data encoded at high compression ratio while preserving the true edge of the original image.

Next, the image from which the noise is removed per area is subjected to the projection processing according to the restriction condition calculated by the restriction condition calculating unit 102, which is like the conventional POCS method and explained according to FIG. 9. First, the color transforming unit 107 transforms the RGB data to the YCrCb data by the color transform. The DCT unit 108 processes the YCrCb data by DCT. The projection processing unit 109 performs the projecting according to the restriction condition calculated by the restriction condition calculating unit 102. The inverse-DCT unit 110 performs the inverse-DCT of the rounded DCT coefficient, and then the image data of YCrCb is reconstructed. The color transforming unit 111 transforms from YCrCb data to RGB data by the color transform, and then the reconstructed image is obtained. In the end, the end deciding unit 112 decides whether the noise removing is terminated or not. When the end deciding unit 112 decides that the processing is terminated, the noise removing processing is terminated and the image from which the noise is removed is outputted. On the other hand, when it is decided that the processing is continued, it goes back to the step that the area specifying unit 103 specifies the block distortion area, the edge area, and the homogeneous area, and then the succeeding steps are executed. This end decision may adopt the same condition as the conventional POCS method.

It is general that the JPEG encoding is performed by thinning (sub-sampling) the color difference component (Cr, Cb) against the luminance component (Y). In this case, when the POCS method is performed, it is preferable to project the DCT coefficient obtained by the sub-sampling. That is to say, regarding the luminance component data and the color difference component data calculated by the color transforming unit 107, the data of the color difference component is thinned out by the sub-sampling same as the JPEG encoding. For example, the color difference component of a pixel is allocated to the luminance component of 2×2 pixels.

The DCT unit 108 performs the DCT processing of the sub-sampled data and calculates the DCT coefficient. After that, the projection processing unit 109 processes the DCT coefficients of the luminance component and the color difference component by the projection processing. At this time, the projection processing unit 109 performs the projecting of the color difference component by using the value of the restriction condition corresponding to the sub-sampled data.

The inverse-DCT unit 110 performs the inverse-DCT processing of the projected DCT coefficient, and then interpolates the thinned color difference component data to the same number of pixels of the luminance component by the inverse-transform of the sub-sampling. According those steps, even when the data is sub-sampled at JPEG encoding, it is possible to carry out the same noise removing processing.

Figure 5:
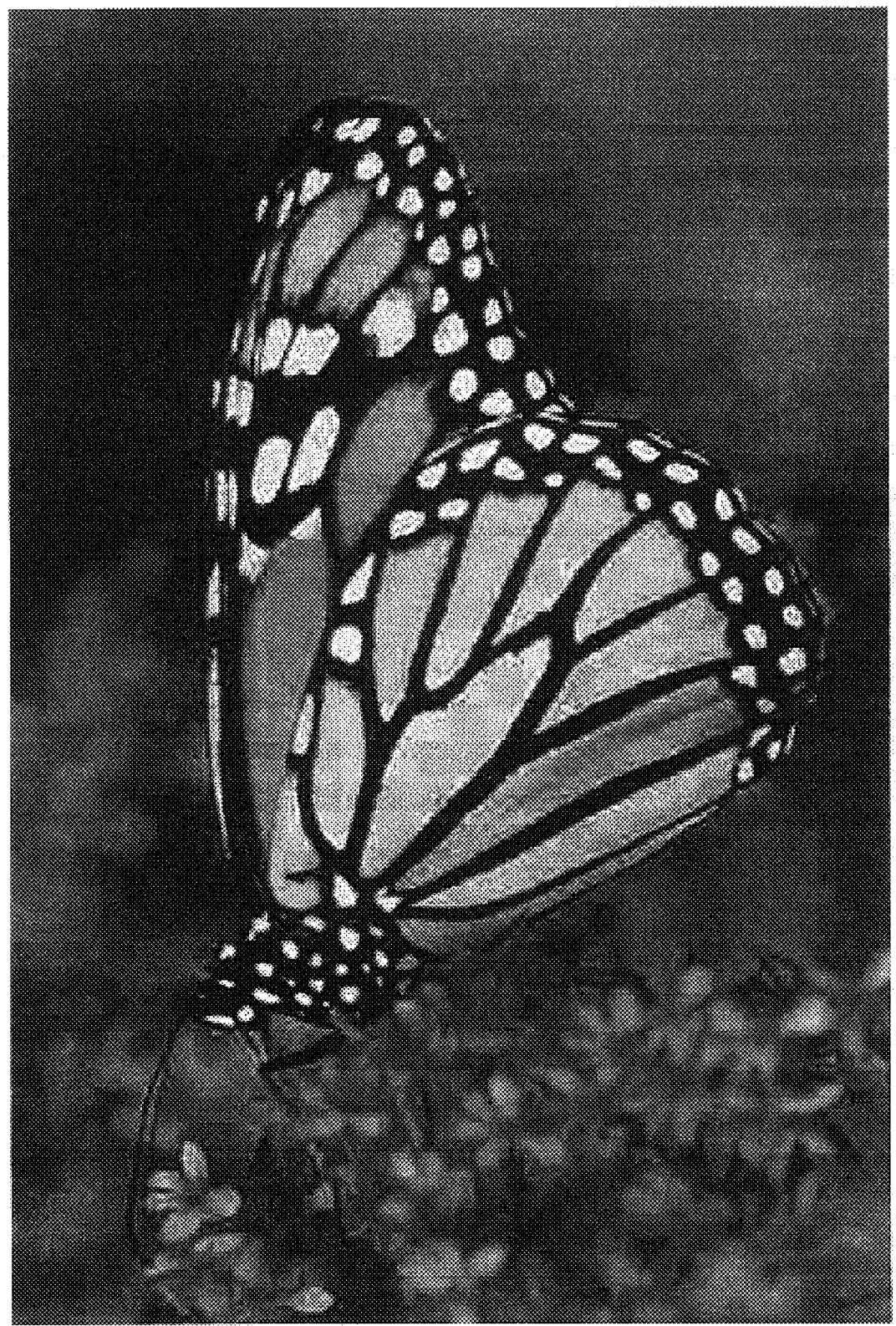
FIG. 5 shows a reconstructed image decoded from the JPEG-compressed data of the original image shown in FIG. 4.
Figure 6:
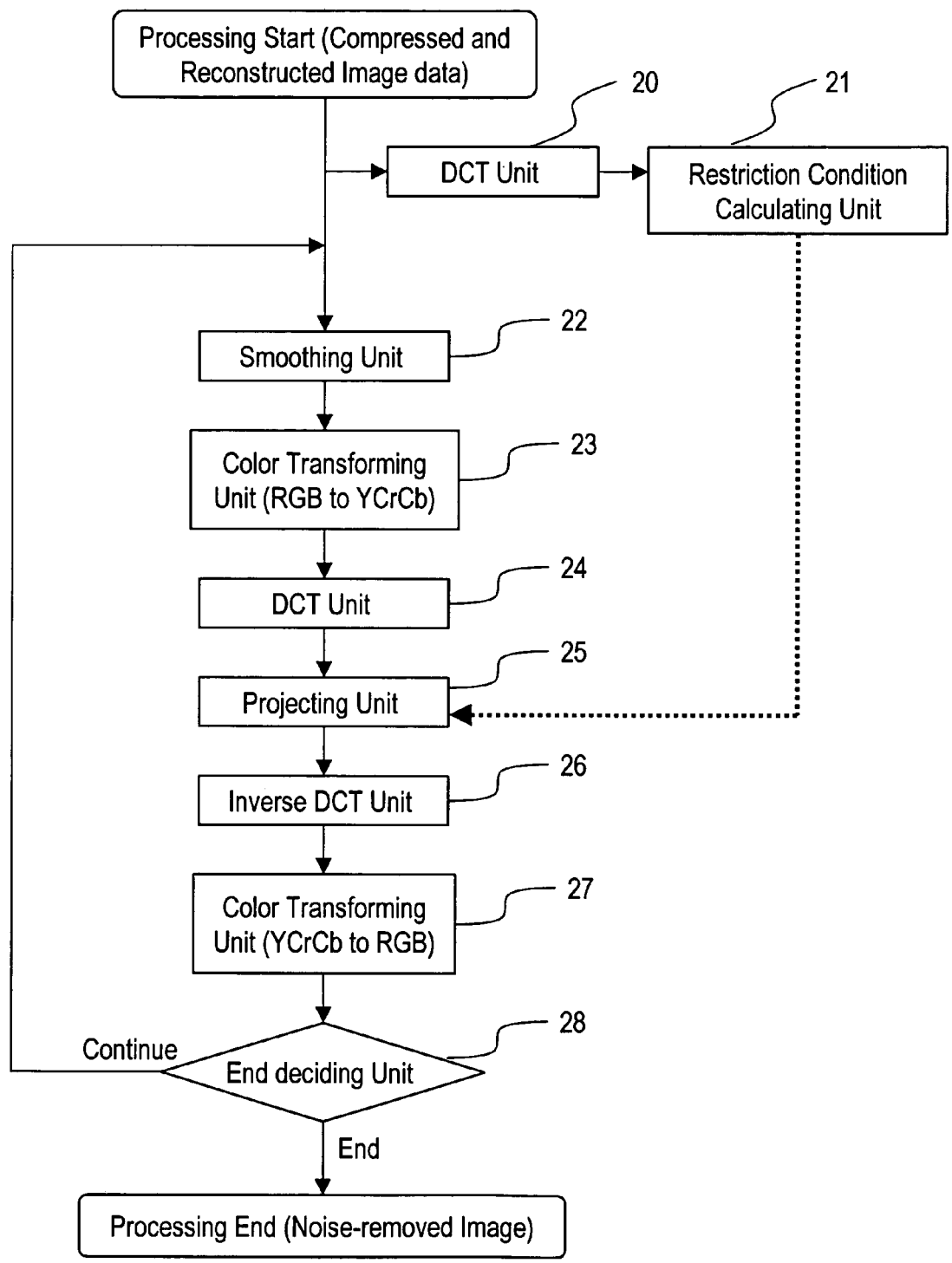
FIG. 6 shows a processing flow of the POCS method.
Figure 7:
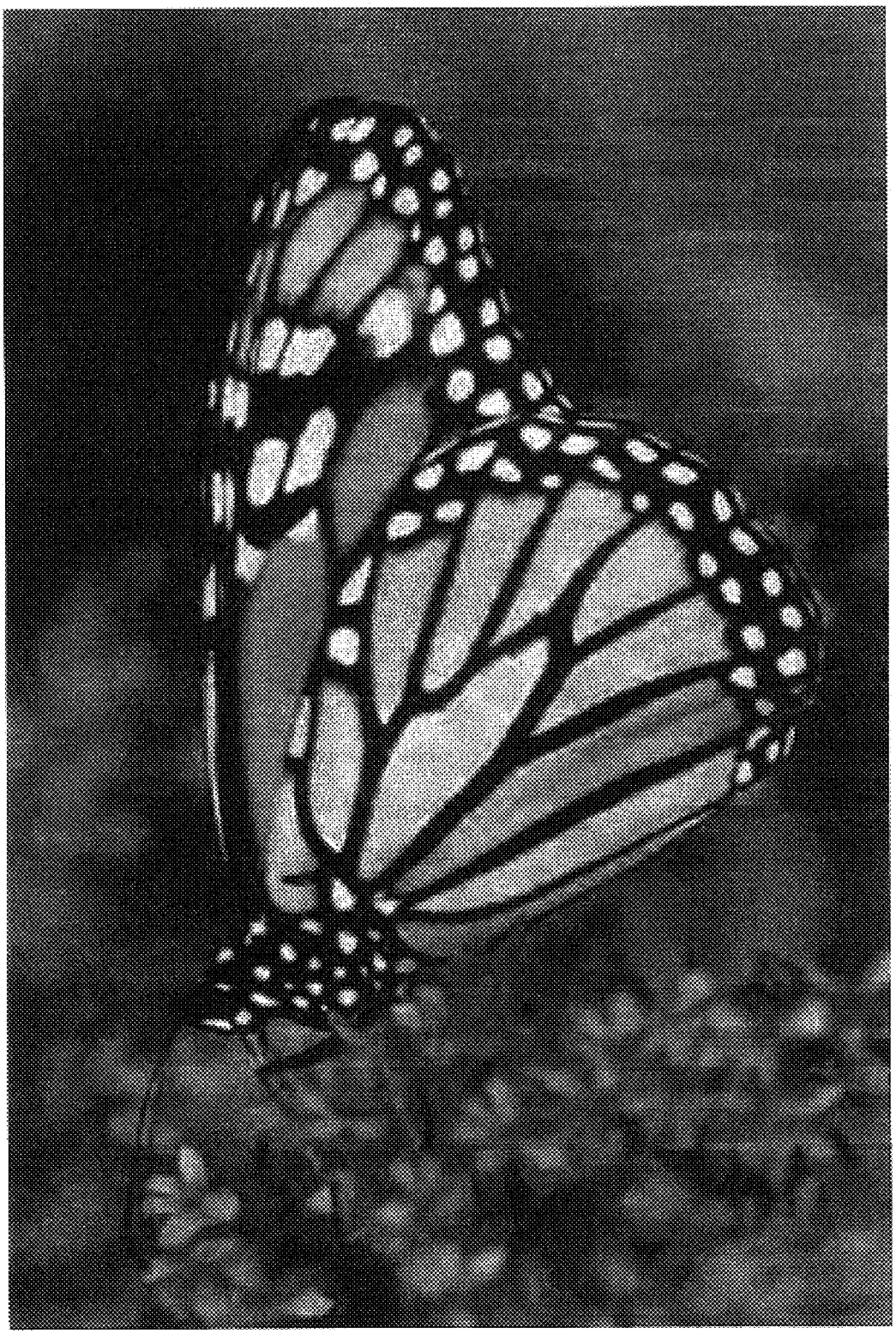
FIG. 7 shows an image obtained by processing the reconstructed image shown in FIG. 5 using the conventional POCS method.
Figure 8:
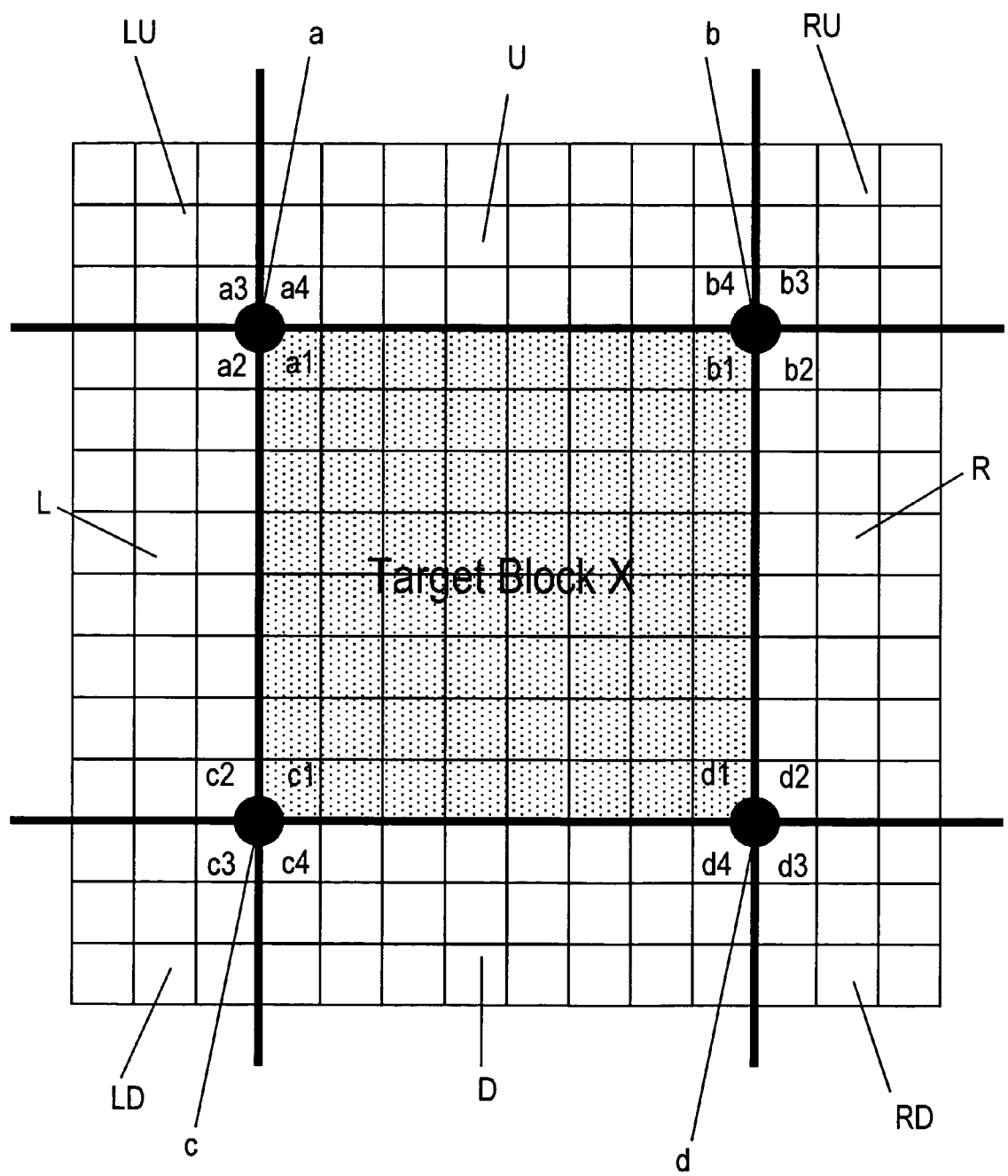
FIG. 8 is an explanatory diagram for the conventional block distortion removal processing.
Figure 17:
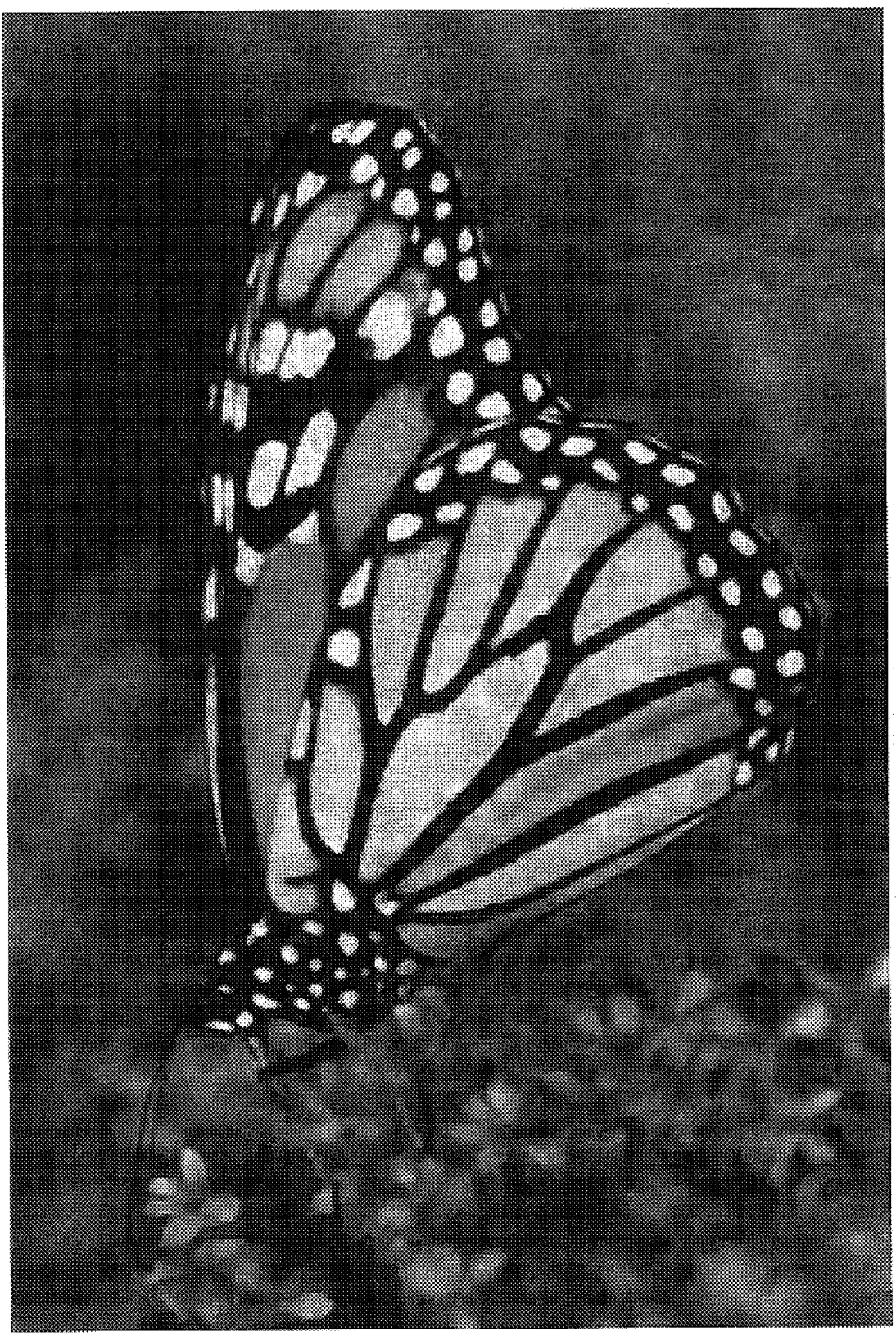
FIG. 17 shows an image of which block distortion is removed by the image processing apparatus in the first embodiment.

FIG. 17 shows an image to which the image processing apparatus of the first embodiment processes the reconstructed image in FIG. 5. It is evident from FIG. 17 that the obstruct block distortion can be removed satisfactory by the image processing of the image processing apparatus of the first embodiment. Moreover, the image processing of the image processing apparatus of the first embodiment can remove the obstruct block distortion on the reconstructed image in FIG. 5 without blurring the true edge of the original image. In addition, the image processing apparatus of the first embodiment can remove the mosquito noise.

Beside, all the above explanations are based on the color image, but it is possible to process the monochrome image by the same processing. In such case, it is possible to skip the steps of the color transforming unit 107 and the color transforming unit 111, and the area specifying unit 103 specifies the block distortion area, the edge area and the homogeneous area by means of the gradation value of the monochrome image. And the block distortion area noise removing unit 104, the edge area noise removing unit 105, and the homogeneous area noise removing unit 106 process the block distortion area, the edge area, and the homogeneous area by the same processing as above, respectively.

Figure 18:
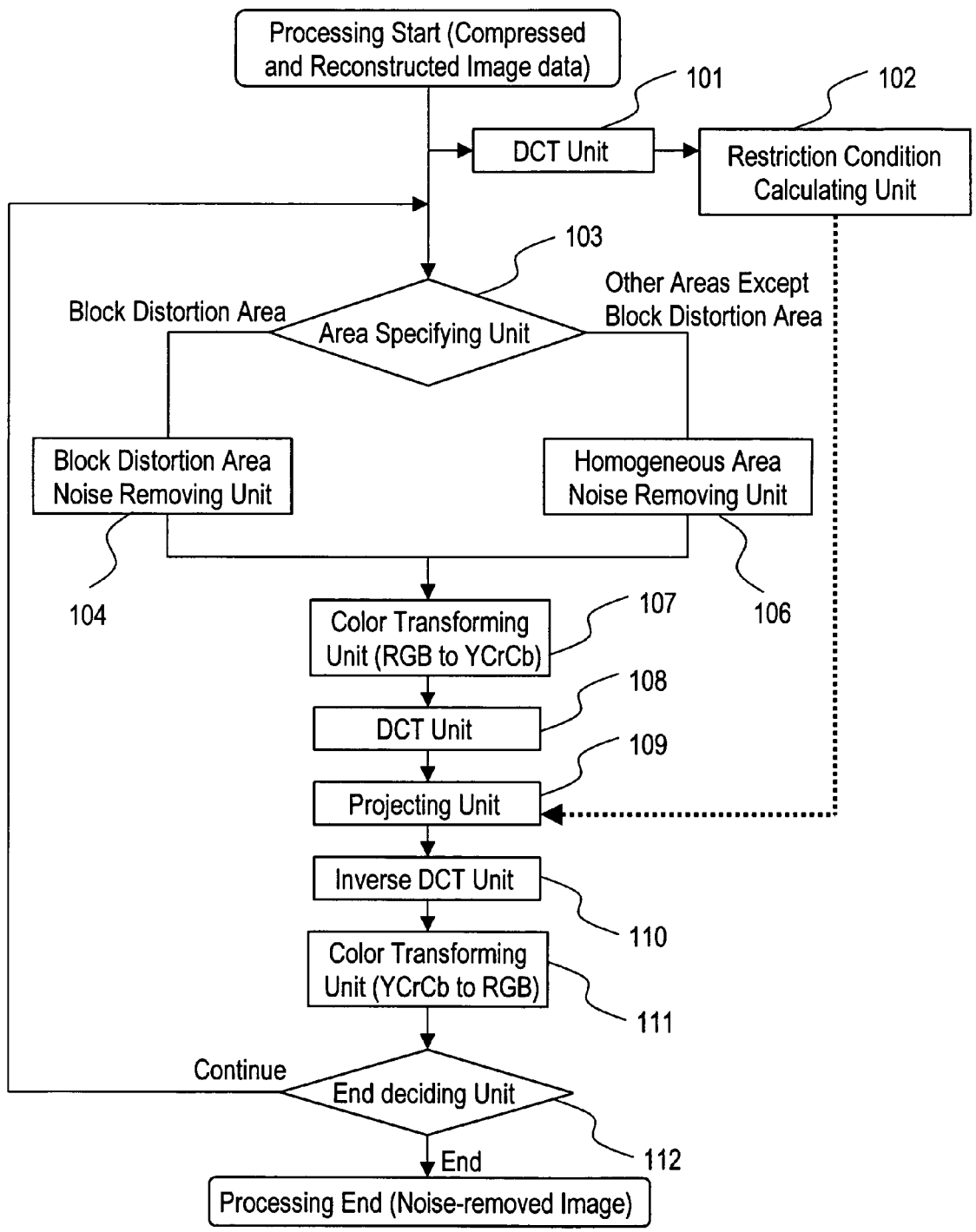
FIG. 18 is a diagram showing the configuration and processing flow of the other image processing apparatus in the first embodiment.

In the above-mentioned first embodiment, the reconstructed image is divided into three areas, such as the block distortion area, the edge area, and the homogeneous area. However, it may be designed as shown in FIG. 18 that the area specifying unit 103 specifies only the block distortion area from the reconstructed image, and the block distortion area noise removing unit 104 removes the noise from the block distortion area in the same way as the block distortion area noise removing unit 104 of the first embodiment. Regarding the other areas except the block distortion area, the homogeneous area noise removing unit 106 may remove the noise therefrom in the same way as the homogeneous area noise removing unit 106 of the first embodiment. Even in this case, it is possible to remove the obstruct block distortion from the reconstructed image effectively. However, at this time, since the homogeneous area noise removing unit 106 performs the strong smoothing of the other areas except the block distortion area, the true edge of the original image gets blurred.

In the above-mentioned first embodiment, the area specifying unit 103 specifies as the block distortion area the blocks wherein all the DCT coefficients over the specific frequency (degree) is less than the predetermined value. And the area specifying unit 103 is preferable to specify as the block distortion area, of the blocks wherein all the DCT coefficients over a specific frequency (degree) are less than a predetermined value, those surrounded only by the blocks wherein all the DCT coefficients over a specific frequency (degree) are less than a predetermined value.

However, the area specifying unit 103 may specify the block distortion area as following method. For example, the area specifying unit 103 specifies edge pixels from plural blocks composing the reconstructed image in a way mentioned above, thereby the blocks having the possibility that the edge existed in the original image can be specified as the edge block. And the area specifying unit 103 may specify, as the block distortion area, blocks not adjoining to the edge block of the blocks wherein all the DCT coefficients over the specific frequency (degree) is less than the predetermined value.

When the blocks not adjoining to the edge block of the blocks wherein all the DCT coefficients over the specific frequency (degree) is less than the predetermined value are specified as the block distortion area, the blocks adjoining to the block distortion area have no mosquito noise caused from the edge. Accordingly, the block neighboring to the thus specified block distortion area has hardly any local improper pixel value regarding the pixel near to the block contacting point due to the mosquito noise, and it is possible to prevent the block contacting point pixel density correction value from being an improper value. In result, it is possible to correct each value of pixels in the block distortion area to a proper value as well as to remove the block distortion.

Otherwise, the area specifying unit 103 specifies the edge pixel from the plural blocks composing the reconstructed image in the way mentioned above, and the blocks having the possibility that the edge existed in the original image are specified as the edge block. And the area specifying unit 103 may specify as the block distortion area the blocks other than the edge block of the reconstructed image and not adjoining to the edge block. Also in this case, the mosquito noise caused from the edge does not exist in the block adjoining to the block distortion area, so that the block neighboring to the thus specified block distortion area has hardly any local improper pixel value regarding the pixel near to the block contacting point due to the mosquito noise. Therefore, it is possible to avoid the block contacting point pixel density correction value to have an improper value. And it is possible to correct each value of pixels in the block distortion area to a proper value as well as to remove the block distortion. Besides, in this case, the blocks other than the edge blocks in the reconstructed image and adjoining to the edge block are considered as the homogeneous area, which are smoothed strongly by the homogeneous noise removing unit 106.

Additionally, in the above-mentioned first embodiment, the area specifying unit 103 performs the DCT processing of all the blocks composing the reconstructed image, and specifies as the block distortion area the blocks, each of said blocks wherein all the DCT coefficients over the specific frequency (degree) are less than the predetermined value. However, the area specifying unit 103 does not perform the DCT processing of each block composing the reconstructed image, but may specifies as the block distortion area the blocks wherein all the DCT coefficients over the specific frequency (degree) obtained by decoding and inverse-quantizing the JPEG compressed data are less than the predetermined value.

Moreover, of the blocks of the block distortion area specified as above, the blocks surrounded only by the blocks wherein all the DCT coefficients over a specific frequency (degree) are less than a predetermined value, or the blocks not adjoining to the edge block may be specified as the block distortion area by the area specifying unit 103.

Even when the block distortion area is specified in such way, it is possible to remove the obstruct block distortion as well as the above case. And it is possible to correct each value of the pixels in the block distortion area to a proper value.

Now, there is a very rare occasion when the block distortion area specified by the area specifying unit 103 includes the block on which boundary a true edge of the original image is positioned. When each pixel value in the block distortion area X including such block with true edge is subjected to the correction by using the block contacting point pixel density calculated from the pixel value of blocks traversing the edge, the edge existing on the block boundary is lost perfectly.

To settle such problem, when each block contacting point pixel density correction value on the block contacting point is calculated, if either of respective differences between the block contacting point pixel density calculated from the pixel in the block distortion area X and the other three values of the block contacting point pixel density calculated from the pixels in three blocks adjoining to the block distortion area X is over a predetermined value, the block contacting point pixel density correction value should be calculated without using said block contacting point pixel density.

That is to say, if the calculation results in that the block contacting point pixel density is far different from the block contacting point pixel density calculated from the pixel in the block distortion area X, it decides that the true edge of the original image existed on the block boundary. And by subtracting the block contacting point pixel density calculated from the pixel in the block distortion area X from the average of the other three or less block contacting point pixel density values, the density correction value of the block contacting point pixel is calculated.

According to such method, it is possible to remove the block distortion effectively without blurring the edge of the original image.

Embodiment 2

The image processing apparatus in a second embodiment of the invention is explained here.

Figure 19:
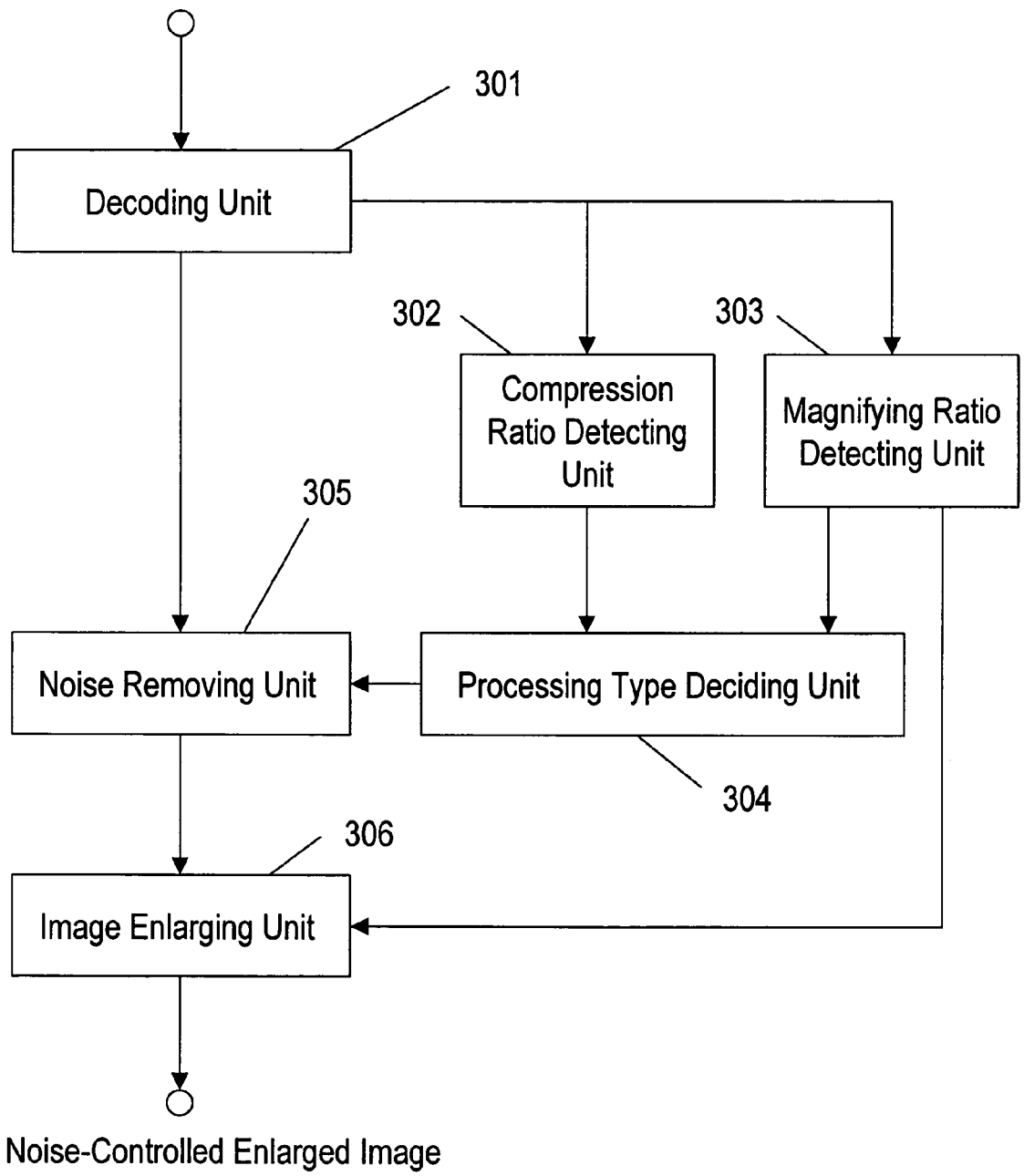
FIG. 19 is a diagram showing the configuration and processing flow of the image processing apparatus in the second embodiment.

FIG. 19 shows a configuration and a processing flow of the image processing apparatus in the second embodiment.

Here is explained briefly about the working of the image processing apparatus in the second embodiment.

A decoding unit 301 decodes the JPEG compressed data, and thereby a reconstructed image is obtained. And a compression ratio detecting unit 302 detects the compression ratio of the JPEG compressed data. A magnifying ratio detecting unit 303 detects the magnifying ratio for outputting the reconstructed image.

A processing type deciding unit 304 decides a processing type of the noise removing processing based on the compression ratio detected by the compression ratio detecting unit 302 and the magnifying ratio detected by the magnifying ratio detecting unit 303. The noise removing unit 305 removes the noise appearing in the reconstructed image according to the processing type decided by the processing type deciding unit 304. And in the end, an image enlarging unit 306 enlarges the image data based on the magnifying ratio detected by the magnifying ratio detecting unit 303.

The processing of each component of the image processing apparatus of the second embodiment is explained in detail hereinafter.

Figure 1:
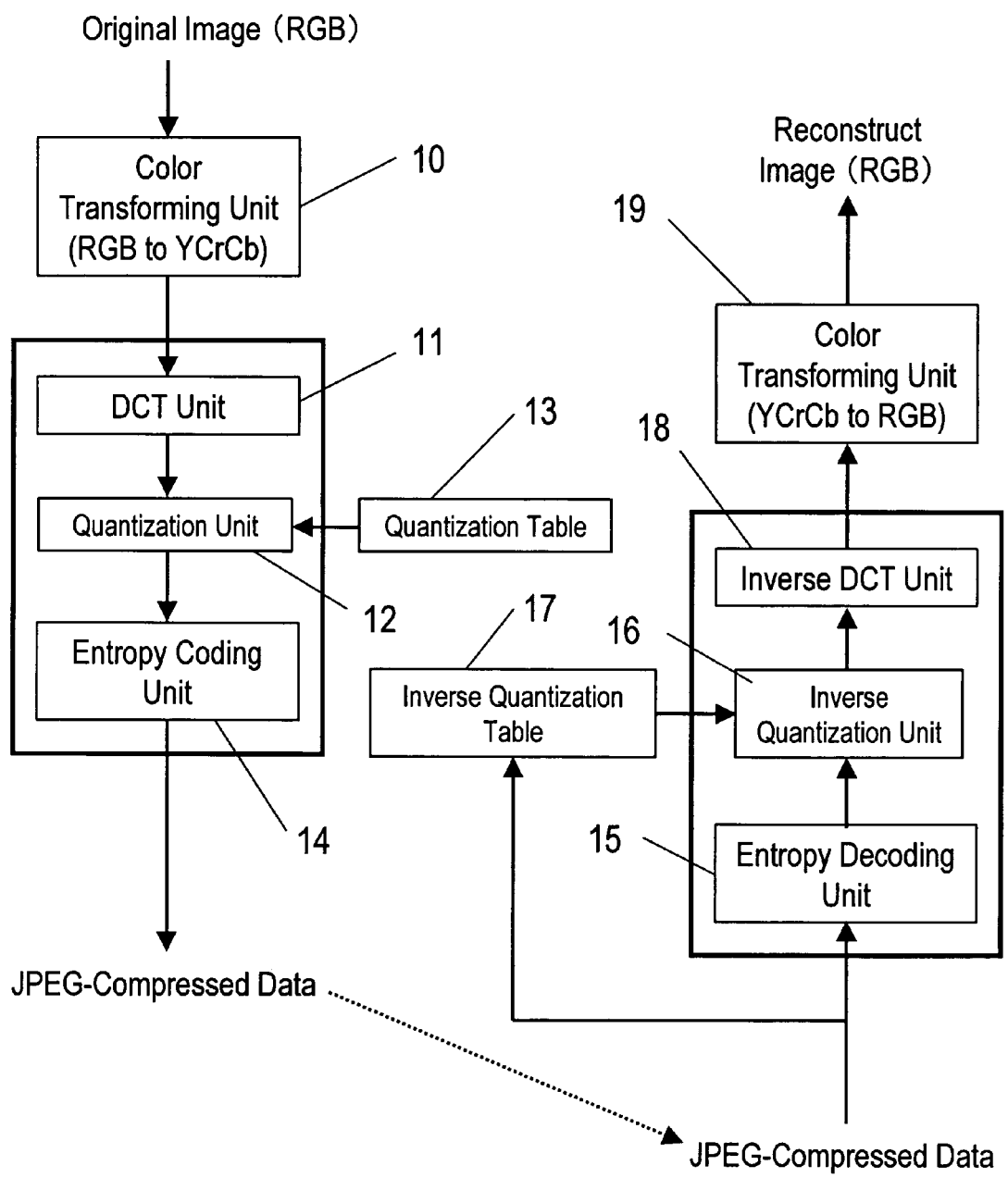
FIG. 1 shows a processing flow of the JPEG coding and decoding.
Figure 4:
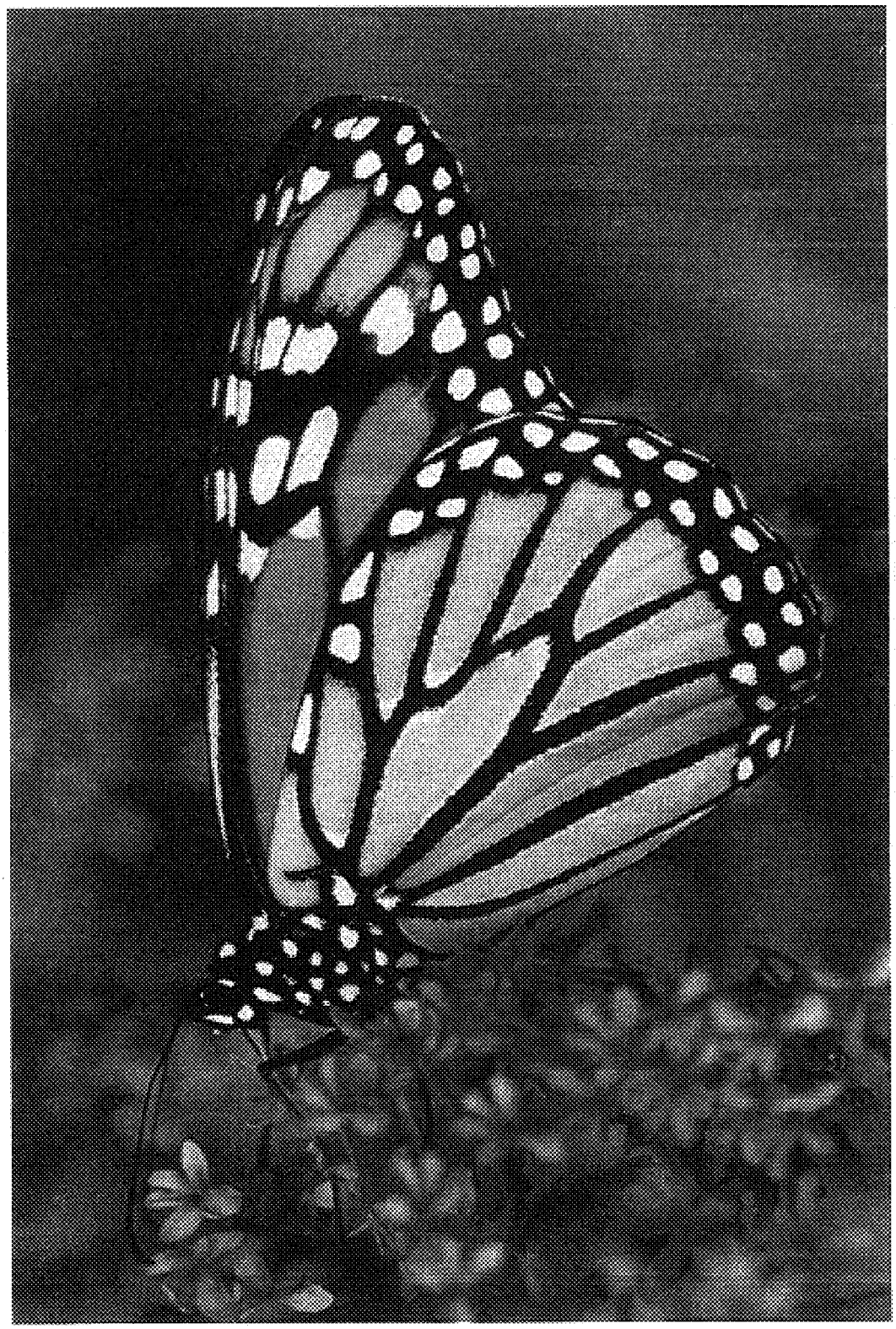
FIG. 4 shows an example of an original image.

The decoding unit 301 performs the decoding from JPEG compressed data to image data. The decoding is carried out by the steps from the entropy decoding unit 15 through the color transforming unit 19 shown in FIG. 1. After the decoding, the decoding unit 301 transfers to the compression ratio detecting unit 302 the data size of the JPEG compressed data and the data size of the decoded image data.

The compression ratio detecting unit 302 detects the compression ratio of the JPEG compressed data before the reconstructed image according to information transferred from the decoding unit 301. For instance, according to the ratio of the data sizes before to after the decoding, the compression ratio detecting unit 302 detects the compression ratio of the JPEG compressed data before the reconstructed image.

And the magnifying ratio detecting unit 303 detects the magnifying ratio for outputting the reconstructed image. For instance, according to the relation among the number of pixels of the reconstructed image, the resolution of the outputting device and the output size of the image, the magnifying ratio detecting unit 303 detects the magnifying ratio of the output image to the reconstructed image. To be more concrete, when the reconstructed image of VGA size (Video Graphics Array, 640×480 pixels) is outputted to A4 size by a printer with the resolution of 600 dpi, the magnifying ratio is about 8 times in respective longitudinal and vertical directions.

According to the compression ratio detected by the compression ratio detecting unit 302 and the magnifying ratio detected by the magnifying ratio detecting unit 303, the processing type deciding unit 304 decides the type of the noise removing processing made by the noise removing unit 305. The method of deciding the type of the noise removing processing, said decision is made by the processing type deciding unit 304, is explained here more definitely.

The processing type deciding unit 304 is provided with a filter deciding table that shows a predetermined relation among the compression ratio, the magnifying ratio, and the filter size, as shown in FIG. 20. The filter deciding table shows the predetermined relation among the compression ratio, the magnifying ratio, and the filter size if there are respective three levels of the compression ratio and the magnifying ratio.

According to the filter deciding table shown in FIG. 20, the processing type deciding unit 304 selects a filter decided uniquely by both the compression ratio detected by the compression ratio detecting unit 302 and the magnifying ratio detected by the magnifying ratio detecting unit 303.

For instance, where the compression ratio detected by the compression ratio detecting unit 302 is a compression ratio level 1 and the magnifying ratio detected by the magnifying ratio detecting unit 303 is a magnifying ratio level 2, the processing type deciding unit 304 selects "B-1" filter as a filter to be used by the noise removing unit 305.

In the filter deciding table shown in FIG. 20, the compression ratio level 1 is higher in the compression ratio than the compression ratio level 2, and the compression ratio level 2 is higher in the compression ratio than the compression ratio level 3. And the magnifying ratio level 1 is higher in the magnifying ratio than the magnifying ratio level 2, and the magnifying ratio level 2 is higher in the magnifying ratio than the magnifying ratio level 3. The magnifying ratio level 1 is for outputting the reconstructed image by enlarging the reconstructed image 8 times in respective vertical and horizontal directions, the magnifying ratio level 2 is for outputting the reconstructed image by enlarging the image 4 times in respective vertical and horizontal directions, and the magnifying ratio level 3 is for outputting the reconstructed image as it is without enlarging.

The processing type deciding unit 304 may be provided with a filter deciding table shown in FIG. 21 or FIG. 22 instead of the filter deciding table shown in FIG. 20. In such case, according to the filter deciding table shown in FIG. 21 or FIG. 22, the processing type deciding unit 304 selects a filter decided uniquely by both the compression ratio detected by the compression ratio detecting unit 302 and the magnifying ratio detected by the magnifying ratio detecting unit 303.

The differences among the filter deciding tables in FIG. 20, FIG. 21, and FIG. 22 are explained here. The filter deciding table in FIG. 20 shows the relation among the compression ratio and the magnifying ratio and the filter size when all the filter coefficients are the same and the sizes differ according to the compression ratio and the magnifying ratio. The filter deciding table in FIG. 21 shows the relation among the compression ratio and the magnifying ratio and the filter coefficient when all the filter sizes are the same and the coefficients differ according to the compression ratio and the magnifying ratio. The filter deciding table in FIG. 22 shows the relation among the compression ratio and the magnifying ratio and the filter when both the filter sizes and coefficients differ according to the compression ratio and the magnifying ratio.

For example, according to the filter deciding table in FIG. 20, when the compression ratio is level 3 and the magnifying ratio is level 3, a filter C-3 does not change at all before and after the processing. When such filter is selected by the processing type deciding unit 304, the noise removing unit 305 may be designed not to perform the noise removing processing.

The processing type deciding unit 304 is provided with three types of the filter deciding tables as shown in FIGS. 20, 21 and 22. Before the processing type deciding unit 304 decides the processing type, a user may instruct the processing type deciding unit 304 on a filter deciding table to be used. For instance, in the filter deciding table in FIG. 22, as compared with the filter deciding table in FIG. 20, the coefficients around the center of the filter are larger. Accordingly, the smoothing based on the filter deciding table in FIG. 22 is weaker than that on the filter deciding table in FIG. 20. If the user wants to control the edge blurring rather than to reduce the mosquito noise, the user may instruct to use the filter deciding table in FIG. 20. And, the processing type deciding unit 304 selects the filter to be applied to the noise removing unit 305 from the filter deciding table specified by the user.

According to the type decided by the processing type deciding unit 304, the noise removing unit 305 removes the noise appearing in the reconstructed image. The after-mentioned explanation relates to the noise removing processing that enables to effectively remove the block distortion in particular among the noises appearing in the reconstructed image.

Figure 23:
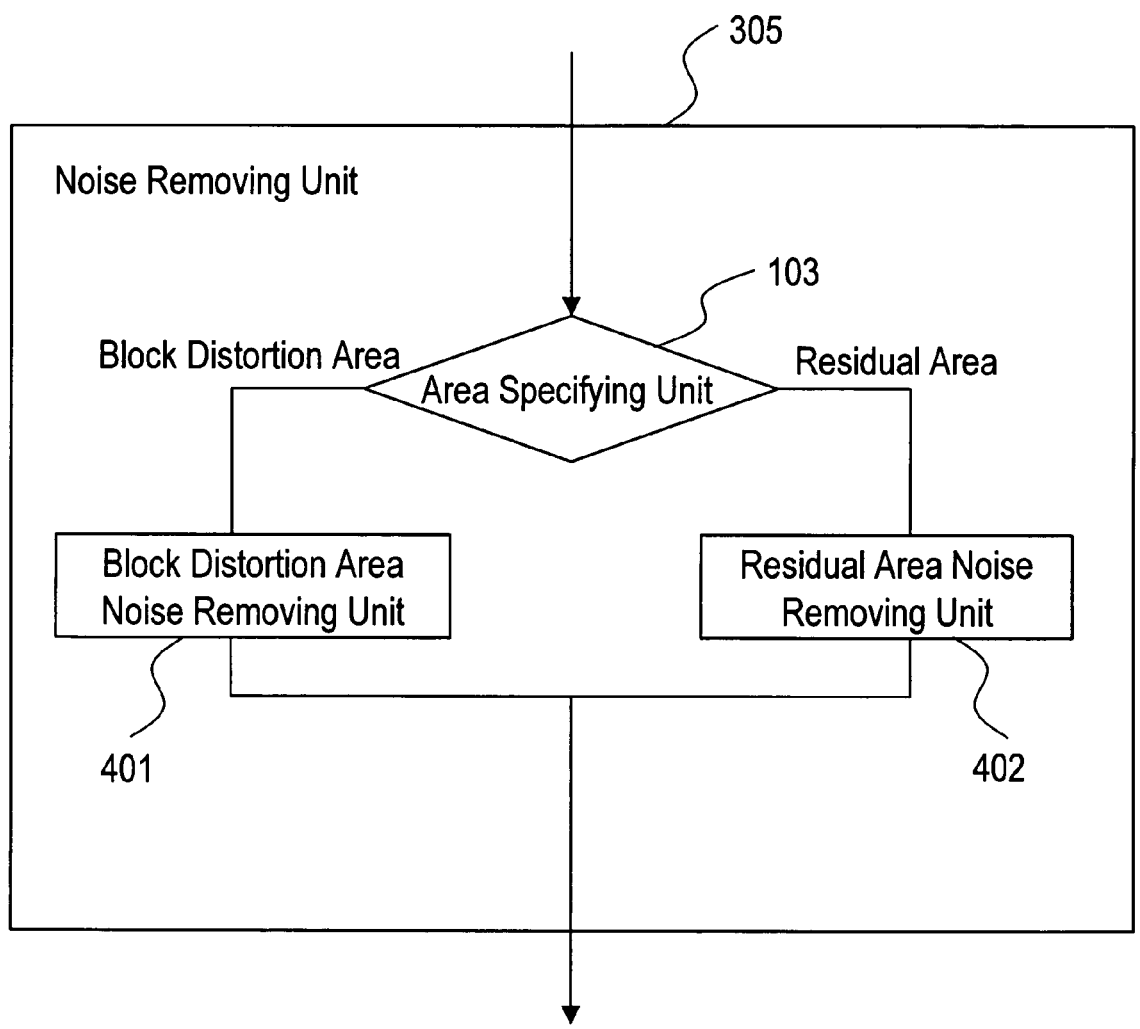
FIG. 23 is a diagram showing an internal structure of the noise removing unit 305.

FIG. 23 shows a configuration of the noise removing unit 305. As shown in FIG. 23, the noise removing unit 305 comprises the area specifying unit 103, a bock distortion area noise removing unit 401, and a residual area noise removing unit 402.

The area specifying unit 103 specifies a block distortion area decided to have a strong block distortion and the other areas. Besides, the method of specifying the block distortion area by the area specifying unit 103 may be the same as the area specifying unit 103 in the first embodiment.

The block distortion can be removed effectively from the block distortion area specified by the area specifying unit 103 according to the following method. In general, it is very difficult to remove effectively the sharp block distortion caused from the high compression by filtering them uniformly. Therefore, the image processing apparatus in the second embodiment adopts a method of effectively removing the block distortion by uniformly dispersing the discontinuity of the gradation on the block boundary over the pixels within the block.

Figure 24:
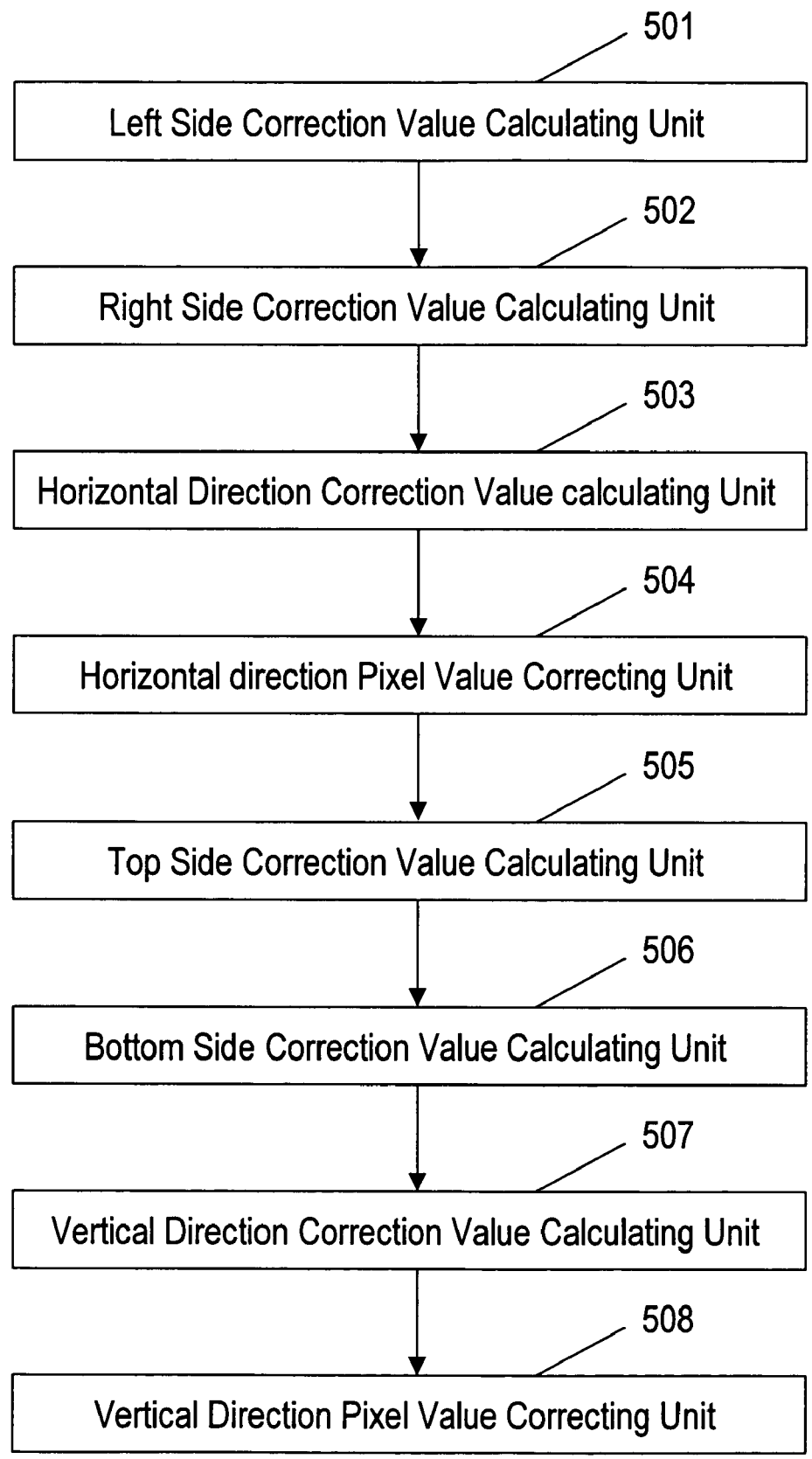
FIG. 24 is a diagram showing the configuration and processing flow of the block distortion area noise removing unit 401.
Figure 26:
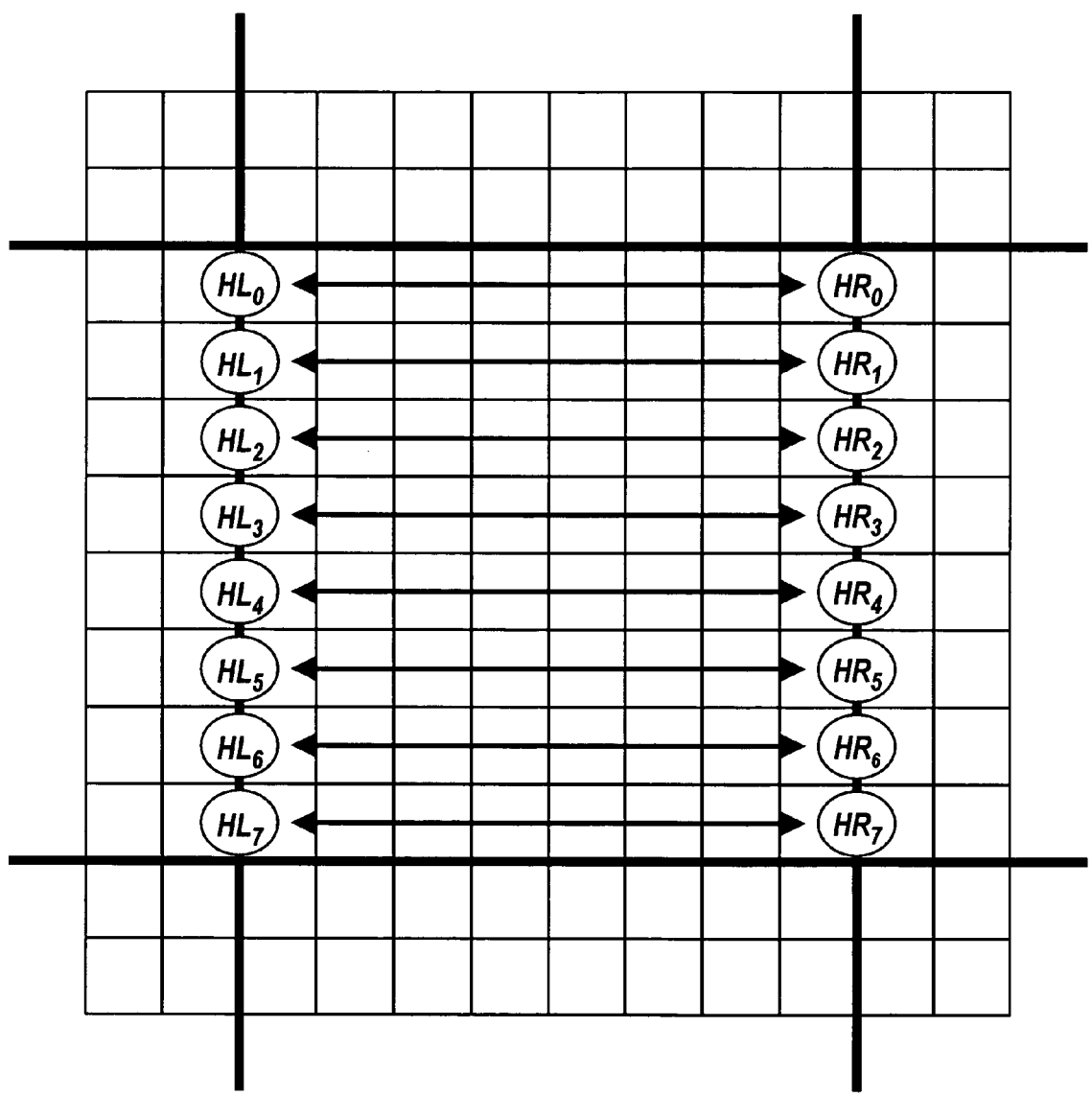
FIG. 26 is a diagram explaining the processing of removing the block distortion from the right and left block boundaries of the block distortion area.
Figure 28:
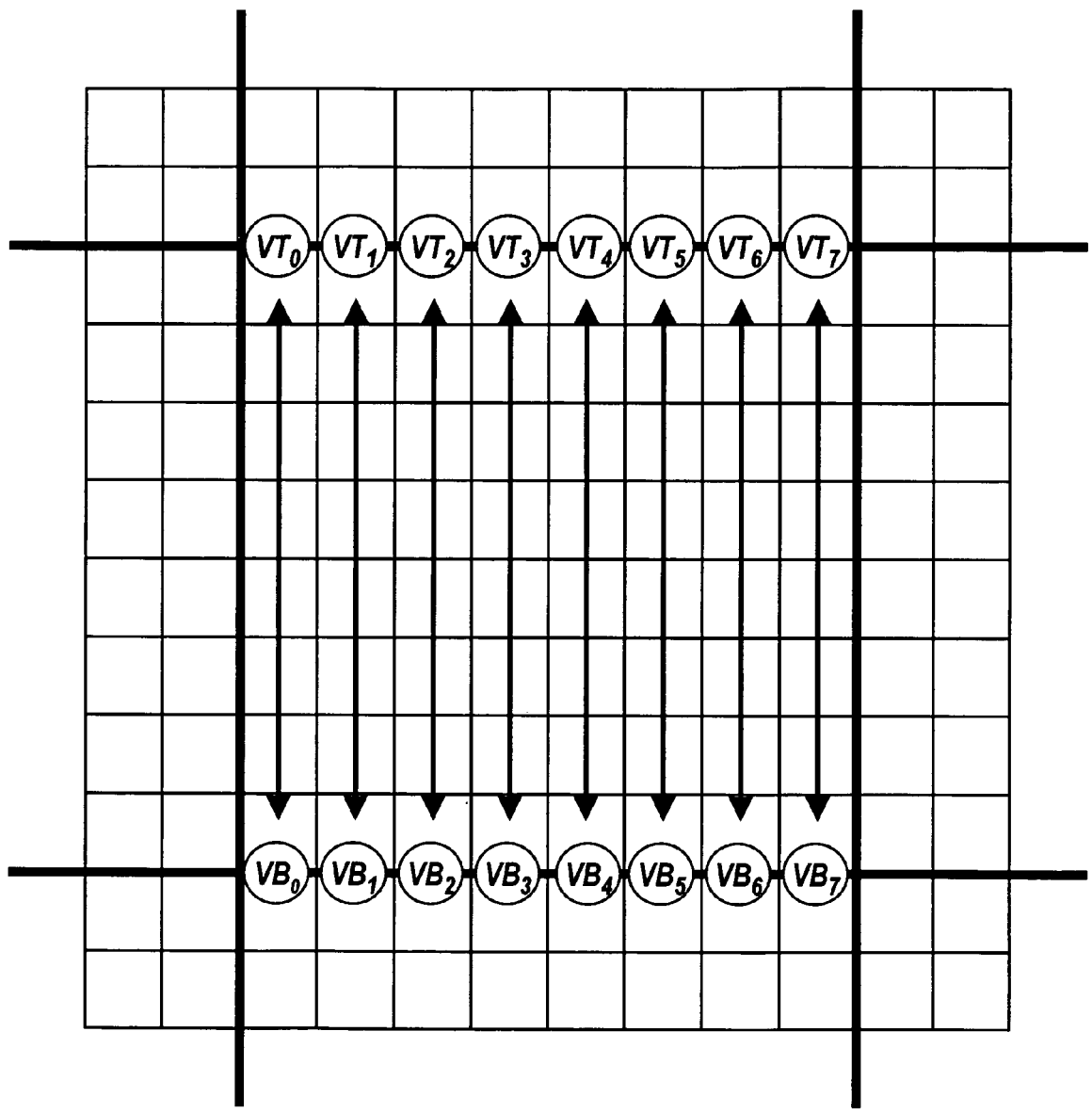
FIG. 28 is a diagram explaining the processing of removing the block distortion from the top and bottom block boundaries of the block distortion area.

Referring to FIG. 24 to FIG. 28, the block distortion removing method in the second embodiment is explained in detail. FIG. 24 shows a configuration and a processing flow of the block distortion area noise removing unit 401 which performs such method. FIG. 25 to FIG. 28 are diagrams for explaining the algorism of this method. In FIG. 25, $P_{ij}, A_{ij}, B_{ij}, C_{ij}$, and $D_{ij}$ (i: a position of pixel on the horizontal direction in a block, j: a position of pixel on the vertical direction in a block) express a pixel respectively, and a bold line expresses a block boundary. And a block consisting of pixels expressed by $P_{ij}$ is a block distortion area to be processed, which is called a target block hereinafter.

A left side correction value calculating unit 501, a right side correction value calculating unit 502, a horizontal direction correction value calculating unit 503, and a horizontal direction pixel value correcting unit 504, which are shown in FIG. 24, remove the discontinuity of the gradation on the right and left block boundary of the target block. The following is an explanation of the method of removing the discontinuity of the gradation on the right and left block boundary of the target block.

As the pre-processing for removing the left side block distortion of the target block, the left side correction value calculating unit 501 calculates a left side correction value $(HL_j)$ per line within the target block. To be more precisely, the left side correction value calculating unit 501 gives the left side correction value $(HL_j)$ based on the expression 13 to an intermediate position between the left end pixel $(P_{0j})$ and the pixel $(B_{7j})$ on the left side of the pixel $(P_{0j})$, that is to say, a position on the block boundary line, per line within the target block shown in FIG. 25 (see FIG. 26). That is, the left side correction value calculating unit 501 calculates the left side correction value $(HL_j)$ per line by subtracting the pixel $(P_{0j})$ value from an average of the left end pixel $(P_{0j})$ value and the pixel $(B_{7j})$ on the left side of $P_{0j}$.

$$HL_j=(P_{0j}+B_{7j})/2-P_{0j}=(B_{7j}-P_{0j})/2 \qquad \text{Expression 13}$$

Likewise, as the pre-processing for removing the right side block distortion of the target block, the right side correction value calculating unit 502 calculates a right side correction value $(HR_j)$ per line within the target block. To be more precisely, the right side correction value calculating unit 502 gives the right side correction value $(HR_j)$ to an intermediate position between the right end pixel $(P_{7j})$ and the pixel $(C_{0j})$ on the right side of the pixel $(P_{7j})$, that is to say, a position on the block boundary line, regarding each line within the target block shown in FIG. 25, according to a following Expression 14 (see FIG. 26). That is, the right side correction value calculating unit 502 calculates the right side correction value $(HR_j)$ per line by subtracting the pixel $(P_{7j})$ value from an average of the right end pixel $(P_{7j})$ value and the pixel $(C_{0j})$ on the right side of the pixel $(P_{7j})$.

$$HR_j=(P_{7j}+C_{0j})2-P_{7j}=(C_{0j}-P_{7j})/2 \qquad \text{Expression 14}$$

Next, per pixel on every line within the target block, the horizontal direction correction value calculating unit 503 calculates each correction value $(Y_{ij})$ of the pixels by weighting and averaging the left side correction value $(HL_j)$ and the right side correction value $(HR_j)$ according to the distance between respective the pixel and the right and left block boundary line of the target block by means of the following expression 15.

$$Y_{ij}=(HL_j\times(7.5-i)+HR_j\times(i+0.5))/8 \qquad \text{Expression 15}$$

The horizontal direction pixel value correcting unit 504 adds each correction value $Y_{ij}$ of the pixels on every line calculated by the horizontal direction correction value calculating unit 503 to the corresponding pixel $(P_{ij})$ value, and then finds each corrected pixel $(Q_{ij})$ value on every line, by means of the following expression 16.

$$Q_{ij}=P_{ij}+Y_{ij} \qquad \text{Expression 16}$$

According to the above processing, the discontinuity of the gradation on the block boundary of the right and left side of target block is dispersed uniformly over the pixels in the block, thereby it is possible to remove the block distortion of the block boundary on the right and left side of the target block effectively.

Regarding the top and bottom direction, the same processing is performed. That is to say, the gradation discontinuity on the top and bottom side block boundaries of the target block is removed from the image from which the block distortion of the right and left side block boundaries of the target block is removed, by means of a top side correction value calculating unit 505, a bottom side correction value calculating unit 506, a vertical direction correction value calculating unit 507, and a vertical direction pixel value correcting unit 508 shown in FIG. 24. The following explains the method of removing the gradation discontinuity on the top and bottom block boundaries of the target block.

As the pre-processing for removing the top side block distortion of the target block, the top side correction value calculating unit 505 calculates a top side correction value $(VT_i)$ per line within the target block. To be more precisely, the top side correction value calculating unit 505 gives the top side correction value $(VT_i)$ to an intermediate position between the top end pixel $(Q_{i0})$ and the pixel $(A_{i7})$ on the top side of the pixel $Q_{i0}$, that is to say, a position on the block boundary line, per line within the target block shown in FIG. 27, according to a following Expression 17 (see FIG. 28). That is, the top side correction value calculating unit 505 calculates the top side correction value $(VT_i)$ per line by subtracting the pixel $(Q_{i0})$ value from an average of the top end pixel $(Q_{i0})$ value and the pixel $(A_{i7})$ on the top side of $Q_{i0}$. Besides, FIG. 27 shows each pixel $Q_{ij}$ composing the image from which the block distortion of the right and left side block boundaries of the target block is removed.

$$VT_i=(Q_{i0}+A_{i7})/2-Q_{i0}=(A_{i7}-Q_{i0})/2 \qquad \text{Expression 17}$$

Likewise, as a pre-processing for removing the bottom side block distortion of the target block, the bottom side correction value calculating unit 506 calculates a bottom side correction value $(VB_i)$ per line within the target block. To be more precisely, the bottom side correction value calculating unit 506 gives the bottom side correction value $(VB_i)$ to an intermediate position between the bottom end pixel $(Q_{i7})$ and the pixel $(D_{i0})$ on the lower side of the pixel $Q_{i7}$, that is to say, a position on the block boundary line, per line within the target block shown in FIG. 27, according to a following Expression 18 (see FIG. 28). That is, the bottom side correction value calculating unit 506 calculates the bottom side correction value $(VB_i)$ per line by subtracting the pixel $(Q_{i7})$ value from an average of the bottom end pixel $(Q_{i7})$ value and the pixel $(D_{i0})$ on the lower side of the pixel $Q_{i7}$.

$$VB_i=(Q_{i7}+D_{i0})/2-Q_{i7}=(D_{i0}-Q_{i7})/2 \qquad \text{Expression 18}$$

Next, the vertical direction correction value calculating unit 507 calculates the correction value $Z_{ij}$ of each pixel on every line in the target block by weighting and averaging the top side correction value ($VT_i$) and the bottom side correction value ($VB_i$) according to the distance between respective a pixel and the top and bottom side block boundaries of the target block.

$$Z_{ij}=(VT_i \times (7.5-j)+VB_i \times (j+0.5))/8 \qquad \text{Expression 19}$$

The vertical direction pixel value correcting unit 508 adds each pixel correction value $Z_{ij}$ on every line calculated by the vertical direction correction value calculating unit 507 to the corresponding pixel ($Q_{ij}$) value according to the following expression (Expression 20), thereby each corrected pixel value ($R_{ij}$) is calculated $$R_{ij}=Q_{ij}+Z_{ij} \qquad \text{Expression 20}$$

According to the above processing, the gradation discontinuity on the top and bottom side block boundaries of the target block is dispersed over the pixels in the target block, in result, it is possible to effectively remove the block distortion of the block boundary on the top and bottom sides of the target block.

The above-mentioned processing is the noise removing processing for the area specified as a block distortion area.

On the other hand, the other area except the block distortion area is subjected to the filtering to remove the noise like the mosquito noise by the residual area noise removing unit 402. As described above, when the filter size is made to be large, for example, the effect of the smoothing becomes large. In result, the efficient of the noise removing gets large, but the blurring of the image becomes large. On the contrary, when the filter size is made to be small, the effect of the smoothing becomes small. The blurring of the image becomes small, but the effect of the noise removing gets small.

In order to perform the noise removing able to remove the noise sufficiently and control the blurring of the image to the minimum, the processing type deciding unit 304 decides the type of the noise removing processing of the residual area noise removing unit 402 as mentioned above before the filtering of the residual noise removing unit 402.

And the residual area noise removing unit 402 performs the filtering of the other area except the block distortion area according to the processing type decided by the processing type deciding unit 304.

By the working of the residual area noise removing unit 402 as mentioned above, it is possible to carry out the proper noise removing processing considering the visual effect based on the magnifying ratio as well as the compression ratio.

In the last place, the image enlarging unit 306 enlarges the image data processed by the noise removing unit 305 according to the magnifying ratio detected by the magnifying ratio detecting unit 303, and then the output image in which the noise is removed can be obtained.

Besides, the "output" in the second embodiment includes the displaying and the printing.

In the above mentioned second embodiment, the compression ratio detecting unit 302 is designed to detect the compression ratio from the data size ratio before and after the decoding, however, the compression ratio detecting unit 302 may detect the compression ratio based on the quantization table information used to the coding of the compressed data.

For example, regarding the value of DC component in the quantization table, a criterion value is set as a specific values S1 and S2 (S1 is larger than S2). The compression ratio detecting unit 302 could decide the compression ratio as follows, when the DC component value is over the specific value S1, the compression ratio is the compression level 1. When the DC component value is over the specific value S2 and under the specific value S1, the compression ratio is the compression level 2. And when the DC component value is under the specific value S2, the compression ratio is the compression level 3.

And the compression ratio detecting unit 302 may decides the compression ratio according to the following method; the compression ratio detecting unit 302 recognizes a plurality of values in the quantization table, and compares the respective recognizing values and a specific values S1 and S2 set to respective plural values (the value S1 is larger than the specific value S2 and indicates shown in the expression 2) the value S1 is larger than the specific value S2. When the number of coefficients over the value S1 is the specific ratio and more, the compression ratio is the compression level 1, and when the number of coefficients over the specific value S1 is less than the specific ratio and the number of the coefficients over the specific value S2 is the specific ratio and more, the compression ratio is the compression level 2, and in case other than the above, the compression ratio is the compression level 3.

In the above-mentioned second embodiment, the magnifying ratio detecting unit 303 detects the magnifying ratio of the output image to the reconstructed image according to the relation of the pixel numbers of the reconstructed image, the resolution of the output apparatus, and the size of output image. However, the magnifying ratio detecting unit 303 may detect the magnifying ratio information that the user has inputted in advance by means of inputting means (which is not shown in the drawings), and detect the magnifying ratio of the output image to the reconstructed image.

The processing type deciding unit 304 may decide the processing type by using either of the compression ratio when the reconstructed image was compressed or the magnifying ratio for outputting the reconstructed image.

Like the description with reference to FIGS. 24-28, in the second embodiment, the noise is removed from the block distortion area by removing the block distortion on the top and bottom of the block boundary in the block distortion area after removing the block distortion on the right and left of the block boundary in the block distortion area. However, the processing order may be exchanged, that is, after removing the block distortion on the top and bottom of the block boundary, the processing of removing the block distortion on the right and left of the block boundary may be performed. According to these steps, it is possible to remove the block distortion sufficiently.

In the above-mentioned second embodiment, the residual area noise removing unit 402 performs the filtering of the other area except the block distortion area, said filtering based on the processing type decided by the processing type deciding unit 304. However, the residual area noise removing unit 402 may perform the filtering of the whole of the reconstructed image based on the processing type decided by the processing type deciding unit 304, in stead of that the block distortion area noise removing unit 401 removes the noises from the block distortion area.

The noise removing method of the block distortion area in the second embodiment may be used as the noise removing method of the block distortion area in the first embodiment. The noise removing method of the block distortion area in the first embodiment may be used as the noise removing method of the block distortion area in the second embodiment.

In the above first and second embodiments, the DCT is used as an example of the orthogonal transform, but the block distortion removing processing in the first and second embodiments is also effective to a case of removing the block distortion from the reconstructed image decoded from the compressed data which is subjected to the orthogonal transform, such as DST (Discrete Sine Transform), DFT (Discrete Fourier Transform). Besides, in the first and second embodiments, since the DCT is used as an example of the orthogonal transform, the DCT coefficient is used as an example of the orthogonal transform coefficient. However, when the Discrete Sine Transform and the Discrete Fourier Transform is used as the orthogonal transform, DST coefficient or DFT coefficient may be used as the orthogonal transform coefficient.

In the first and second embodiments, JPEG is used as an example of the coding, but the block distortion removing method in the first and second embodiments is effective for removing the block distortion from the reconstructed image decoded from the compressed data which has been coded in MPEG or H.261 and so on.

Each configuration component of the image processing apparatus in the first and second embodiments may be configured by the hardware or the software.

By applying to a specific computer a program that functions the computer as all or the part of components of the image processing apparatus in the first and second embodiments, it is possible to carry out the function of all or the part of components of the image processing apparatus in the first and second embodiments on the computer. A concrete embodiment of the program may involve storing the program in a recoding medium such as CD-ROM, and etc., transferring the recoding medium storing the program, and distributing the program by the communication means such as the Internet and the like. And it may also involve installing the program to the computer.

As evidenced by the above description, the invention can provide the image processing apparatus able to specify the block distortion area in the reconstructed image by analyzing the reconstructed image, and remove the block distortion therefrom.

The invention also can provide the image processing apparatus able to remove the block distortion while reconstructing the smooth gradation change even at each corner of block composing the reconstructed image.

Moreover, the invention can provide the image processing apparatus able to perform the efficient noise removing processing suitable for the output of the reconstructed image.

Therefore, the above-mentioned image processing apparatus can remove the noise which generates due to the compression of the original image like the JPEG compression, in particular remove efficiently the sharp block distortion generating due to the high compression processing. In addition, the image processing apparatus can perform the proper noise removing processing according to the degree of the visually bad effect due to the noise.

The invention claimed is:

1. An image processing apparatus for a reconstructed image decoded from a compressed data of an original image, comprising:
an area specifying unit for specifying a block distortion area on the reconstructed image; and
a block distortion area noise removing unit for removing a noise from the block distortion area,
wherein the area specifying unit specifies distortion blocks, said each block in which all orthogonal transform coefficients over a specific frequency are less than a specific threshold value, from blocks in a data obtained by performing the orthogonal transform on the reconstructed image, and determining a block distortion area that consists of the distortion blocks surrounded by the distortion blocks.

2. An image processing apparatus for a reconstructed image decoded from a compressed data of an original image, comprising:
an area specifying unit for specifying a block distortion area on the reconstructed image; and
a block distortion area noise removing unit for removing a noise from the block distortion area,
wherein the area specifying unit specifies distortion blocks, said each block in which all orthogonal transform coefficients over a specific frequency are less than a specific threshold value, from blocks in a data obtained by performing the orthogonal transform on the reconstructed image and an edge block that can be presumed to be an edge of the original image, and determining a block distortion area that consists of the distortion blocks without neighboring to the edge block.

3. An image processing apparatus for a reconstructed image decoded from a compressed data of an original image, comprising:
an area specifying unit for specifying a block distortion area on the reconstructed image; and
a block distortion area noise removing unit for removing a noise from the block distortion area,
wherein the area specifying unit specifies distortion blocks, said each block in which all orthogonal transform coefficients over a specific frequency are less than a specific threshold value, from blocks in a data obtained by compressing the original image, and determining a block distortion area that consists of the distortion blocks surrounded by the distortion blocks.

4. An image processing apparatus for a reconstructed image decoded from a compressed data of an original image, comprising:
an area specifying unit for specifying a block distortion area on the reconstructed image; and
a block distortion area noise removing unit for removing a noise from the block distortion area, wherein the area specifying unit specifies distortion blocks, said each block in which all orthogonal transform coefficients over a specific frequency are less than a specific threshold value, from blocks in a data obtained by compressing the original image and an edge block that can be presumed to be an edge of the original image, and determining a block distortion area that consists of the distortion blocks without neighboring to the edge block.

5. An image processing apparatus for a reconstructed image decoded from a compressed data of an original image, comprising:
an area specifying unit for specifying a block distortion area on the reconstructed image; and
a block distortion area noise removing unit for removing a noise from the block distortion area,
wherein the area specifying unit specifies from plural blocks in the reconstructed image as an edge block that can be presumed to be an edge of the original image; and
determines the block distortion area that consists of the blocks except the edge block and without neighboring to the edge block.

6. An image processing apparatus for a reconstructed image decoded from a compressed data of an original image, comprising:
an area specifying unit for specifying a block distortion area on the reconstructed image; and a block distortion area noise removing unit for removing a noise from the block distortion area, wherein the block distortion area noise removing unit comprises:

a block contacting point pixel density imparting unit, per each of four corners of a target block of the block distortion area, for imparting as a block contacting point pixel value a first value to a block contacting point of the target block, said first value calculated by weighting and averaging a pixel value of a block positioning within a specific distance from the block contacting point according to the distance from the block contacting point, and imparting as the block contacting point pixel value a second value, a third value and a fourth value to the three blocks neighboring to the target block respectively, said second, third and fourth values calculated by weighting and averaging a pixel value of the block positioning within a specific distance from the block contacting point according to the distance from the block contacting point;

a corner correction value calculating unit, per each of four corners of the target block of the block distortion area, for calculating a correction value of each corner by subtracting the first value from the sum of the first value and those of the second, third and fourth values wherein the difference from the first value is less than a specific value;

a correction value calculating unit, per each pixel in the target block of the block distortion area, for calculating a correction value of the pixel in the target block by weighting and averaging the correction values of the four corners of the target block according to respective distances between the pixel and the four block contacting points corresponding to the four corners of the target block; and a pixel value correcting unit for adding the correction value of each pixel calculated by the correction value calculating unit to each corresponding pixel value of the target block of the block distortion area.

7. An image processing apparatus for a reconstructed image decoded from a compressed data of an original image, comprising:

an area specifying unit for specifying a block distortion area on the reconstructed image; and a block distortion area noise removing unit for removing a noise from the block distortion area, wherein the block distortion area noise removing unit comprises:

a left side correction value calculating unit, per each row in the block distortion area of the reconstructed image, for calculating a left side correction value by subtracting a left end pixel value from an average value of the left end pixel value of the block distortion area and the pixel value on the left side of the left end pixel;

a right side correction value calculating unit, per each row in the block distortion area of the reconstructed image, for calculating a right side correction value by subtracting a right end pixel value from an average value of the right end pixel value of the block distortion area and the pixel value on the right side of the right end pixel;

a horizontal direction correction value calculating unit, per each pixel on every row in the block distortion area of the reconstructed image, for calculating a correction value as for the horizontal direction by weighting and averaging the right side correction value and the left side correction value of a target pixel according to the distances between the target pixel and the right and left boundaries;

a horizontal direction pixel value correcting unit for adding the correction values for each pixel on every row calculated by the horizontal direction correction value calculating unit to a corresponding pixel value;

a top side correction value calculating unit, per each column in the block distortion area of the image consisting of pixels corrected by the horizontal direction pixel value correcting unit, for calculating a top side correction value by subtracting a top end pixel value from an average value of the top end pixel value of the block distortion area and the pixel value on the upside of the top end pixel;

a bottom side correction value calculating unit, per each column in the block distortion area of the image consisting of pixels corrected by the horizontal direction pixel value correcting unit, for calculating a bottom side correction value by subtracting a bottom end pixel value from an average value of the bottom end pixel value of the block distortion area and the pixel value on the downside of the bottom end pixel;

a vertical direction correction value calculating unit, per each pixel on every column in the block distortion area, for calculating a correction value as for the vertical direction by weighting and averaging the top side correction value and the bottom side correction value of a target pixel according to the distances between the target pixel and the top and bottom boundaries; and a vertical direction pixel value correcting unit for adding the correction value for each pixel on every column calculated by the vertical direction correction value calculating unit to a corresponding pixel value corrected by the horizontal direction pixel value correcting unit.

8. An image processing apparatus for a reconstructed image decoded from a compressed data of an original image, comprising:

an area specifying unit for specifying a block distortion area on the reconstructed image; and a block distortion area noise removing unit for removing a noise from the block distortion area, wherein the block distortion area noise removing unit comprises:

a top side correction value calculating unit, per each column in the block distortion area of the reconstructed image, for calculating a top side correction value by subtracting a top end pixel value from an average value of the top end pixel value of the block distortion area and the pixel value on the upside of the top end pixel;

a bottom side correction value calculating unit, per each column in the block distortion area of the reconstructed image, for calculating a bottom side correction value by subtracting a bottom end pixel value from an average value of the bottom end pixel value of the block distortion area and the pixel value on the downside of the bottom end pixel;

a vertical direction correction value calculating unit, per each pixel on every column in the block distortion area of the reconstructed image, for calculating a correction value as for the vertical direction by weighting and averaging the top side correction value and the bottom side correction value of a target pixel according to the distances between the target pixel and the top and bottom boundaries;

a vertical direction pixel value correcting unit for adding the correction value for each pixel on every column calculated by the vertical direction correction value calculating unit to a corresponding pixel value;

a left side correction value calculating unit, per each row in the block distortion area of the image consisting of pixels corrected by the vertical direction pixel value correcting unit, for calculating a left side correction value by subtracting a left end pixel value from an average value of the left end pixel value of the block distortion area and the pixel value on the left side of the left end pixel;

a right side correction value calculating unit, per each row in the block distortion area of the image consisting of pixels corrected by the vertical direction pixel value correcting unit, for calculating a right side correction value by subtracting a right end pixel value from an average value of the right end pixel value of the block distortion area and the pixel value on the right side of the right end pixel;

a horizontal direction correction value calculating unit, per each pixel on every row in the block distortion area, for calculating a correction value as for the horizontal direction by weighting and averaging the right side correction value and the left side correction value of a target pixel according to the distances between the target pixel and the right and left boundaries; and a horizontal direction pixel value correcting unit for adding the correction value for each pixel on every row calculated by the horizontal direction correction value calculating unit to a corresponding pixel value corrected by the vertical direction pixel value correcting unit.

9. An image processing apparatus for a reconstructed image decoded from a compressed data of an original image, comprising:

an area specifying unit for specifying a block distortion area on the reconstructed image; and a block distortion area noise removing unit for removing a noise from the block distortion area, wherein the area specifying unit specifies on the reconstructed image an edge area that can be presumed to be true edge pixels of the original image, the true edge pixels that are pixels excluding edge assumptive pixels caused from the block distortion, the edge assumptive pixels caused from the mosquito noise, and small gradation change pixels; and said apparatus further comprising an edge area noise removing unit for removing the noise from the edge area specified by the area specifying unit with keeping the edge.

10. An image processing apparatus according to claim 9, the area specifying unit comprises:

a smoothing processing unit for smoothing the reconstructed image;

a secondary differential filtering unit for filtering the smoothed image by the smoothing processing unit by using a secondary differential filter;

an edge assumptive pixel detecting unit for detecting an edge assumptive pixel from the filtered image by the secondary differential filtering unit by means of the zero crossing detection;

a block distortion edge specifying unit for specifying pixels, which can be presumed to be detected by the block distortion cause, from the detected edge assumptive pixels;

a mosquito noise edge specifying unit for specifying pixels, which can be presumed to be detected by the mosquito noise cause, from the detected edge assumptive pixels;

a small gradation change edge specifying unit for specifying pixels, of which edge strength is less than a specific value, from the detected edge assumptive pixels;

an edge pixel specifying unit for specifying as an edge pixel the detected edge assumptive pixels excluding those pixels specified by the block distortion edge specifying unit, the mosquito noise edge specifying unit, and the small gradation change edge specifying unit; and an edge area specifying unit for specifying the edge area according to the edge pixels specified by the edge pixel specifying unit.

11. An image processing apparatus according to claim 10, wherein the edge area specifying unit specifies as the edge area an area consisting of plural pixels within a specific distance from the edge pixels specified by the edge pixel specifying unit.

12. An image processing apparatus according to claim 9, wherein the area specifying unit specifies as a homogeneous area an area on the reconstructed image which is included neither in the block distortion area or in the edge area; and said apparatus comprising:

a homogeneous area noise removing unit for removing the noise from the homogeneous area specified by the area specifying unit.

13. An image processing method for a reconstructed image decoded from a compressed data of an original image, comprising:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by performing the orthogonal transform on the reconstructed image, and determining a block distortion area that consists of the distortion blocks surrounded by the distortion blocks.

14. An image processing method for a reconstructed image decoded from a compressed data of an original image, comprising:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by performing the orthogonal transform on the reconstructed image and an edge block that can be presumed to be an edge of the original image, and determining a block distortion area that consists of the distortion blocks without neighboring to the edge block.

15. An image processing method for a reconstructed image decoded from a compressed data of an original image, comprising:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by compressing the original image, and determining a block distortion area that consists of the distortion blocks surrounded by the distortion blocks.

16. An image processing method for a reconstructed image decoded from a compressed data of an original image, comprising:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by compressing the original image and an edge block that can be presumed to be an edge of the original image, and determining a block distortion area that consists of the distortion blocks without neighboring to the edge block.

17. An image processing method for a reconstructed image decoded from a compressed data of an original image, comprising:

an area specifying step for specifying a block distortion area on the reconstructed image; and a block distortion area noise removing step for removing a noise from the block distortion area, wherein the area specifying step specifies on the reconstructed image an edge area that can be presumed to be true edge pixels of the original image, the true edge pixels that are pixels excluding edge assumptive pixels caused from the block distortion, the edge assumptive pixels caused from the mosquito noise, and small gradation change pixels; and the method further comprising an edge area noise removing step for removing the noise from the edge area specified by the area specifying step with keeping the edge.

18. A computer readable storage medium having a computer program for processing a reconstructed image decoded from a compressed data of an original image, the computer program, when executed, causing a computer to perform the following steps:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by performing the orthogonal transform on the reconstructed image, and determining a block distortion area that consists of the distortion blocks surrounded by the distortion blocks.

19. A computer readable storage medium having a computer program for processing a reconstructed image decoded from a compressed data of an original image, the computer program, when executed, causing a computer to perform the following steps:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by performing the orthogonal transform on the reconstructed image and an edge block that can be presumed to be an edge of the original image, and determining a block distortion area that consists of the distortion blocks without neighboring to the edge block.

20. A computer readable storage medium having a program for processing a reconstructed image decoded from a compressed data of an original image, the computer program, when executed, causing a computer to perform the following steps:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by compressing the original image, and determining a block distortion area that consists of the distortion blocks surrounded by the distortion blocks.

21. A computer readable storage medium having a computer program for processing a reconstructed image decoded from a compressed data of an original image, the computer program, when executed, causing a computer to perform the following steps:

an area specifying step for specifying a block distortion area on the reconstructed image; and a block distortion area noise removing step for removing a noise from the block distortion area, wherein the area specifying step specifies distortion blocks, said each block in which all orthogonal transform coefficients over a specific frequency are less than a specific threshold value, from blocks in a data obtained by compressing the original image and an edge block that can be presumed to be an edge of the original image, and determining a block distortion area that consists of the distortion blocks without neighboring to the edge block.

22. A computer readable storage medium having a computer program for performing a reconstructed image decoded from a compressed data of an original image, the computer program, when executed, causing the computer to perform the following steps:

an area specifying step for specifying a block distortion area on the reconstructed image; and a block distortion area noise removing step for removing a noise from the block distortion area, wherein the area specifying step specifies on the reconstructed image an edge area that can be presumed to be true edge pixels of the original image, the true edge pixels that are pixels excluding edge assumptive pixels caused from the block distortion, the edge assumptive pixels caused from the mosquito noise, and small gradation change pixels; and the computer program further performing an edge area noise removing step for removing the noise from the edge area specified by the area specifying step with keeping the edge.

* * * * *